United States Patent
Gomita

(10) Patent No.: US 9,215,379 B2
(45) Date of Patent: Dec. 15, 2015

(54) IMAGING APPARATUS AND IMAGING PROCESSING METHOD FOR DETECTING AND CORRECTING FLASH BAND

(75) Inventor: Jun Gomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 585 days.

(21) Appl. No.: 13/351,412

(22) Filed: Jan. 17, 2012

(65) Prior Publication Data

US 2012/0188403 A1 Jul. 26, 2012

(30) Foreign Application Priority Data

Jan. 24, 2011 (JP) ................. P2011-012034

(51) Int. Cl.
*H04N 9/73* (2006.01)
*H04N 5/235* (2006.01)
(52) U.S. Cl.
CPC ........... *H04N 5/2351* (2013.01); *H04N 5/2354* (2013.01)
(58) Field of Classification Search
CPC ................. H04N 5/2351; H04N 5/2354
USPC ..................................................... 348/226.1
See application file for complete search history.

(56) References Cited

U.S. PATENT DOCUMENTS

| | | | |
|---|---|---|---|
| 2001/0019357 A1* | 9/2001 | Ito et al. | 348/152 |
| 2007/0120997 A1* | 5/2007 | Sasaki et al. | 348/362 |
| 2007/0147706 A1* | 6/2007 | Sasaki et al. | 382/295 |
| 2009/0135271 A1* | 5/2009 | Kurane | 348/222.1 |
| 2009/0201383 A1* | 8/2009 | Slavin | 348/222.1 |
| 2013/0208149 A1* | 8/2013 | Kamiya | 348/241 |

FOREIGN PATENT DOCUMENTS

| | | |
|---|---|---|
| JP | 2007-306225 | 11/2007 |
| JP | 2010-135921 | 6/2010 |

* cited by examiner

*Primary Examiner* — Usman Khan
(74) *Attorney, Agent, or Firm* — Sony Corporation

(57) ABSTRACT

A flash band processing circuit includes: a flash band detecting circuit that detects a start line and an end line of a flash band, which is a level difference for each line generated within a frame in accordance with flash light, based on a difference in exposure periods of a video signal output for each frame by a pixel included in an imaging device employing a rolling shutter system.

14 Claims, 16 Drawing Sheets

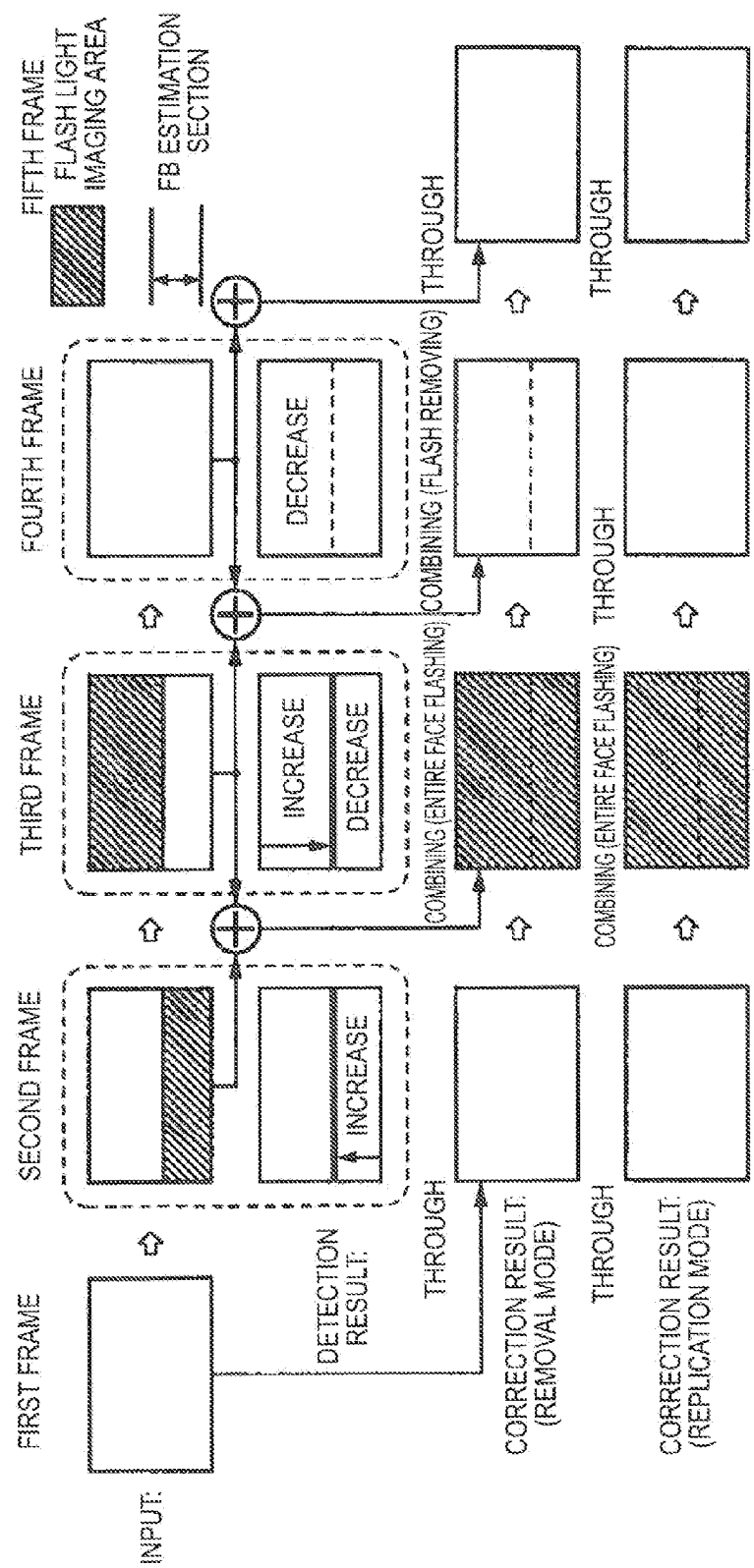

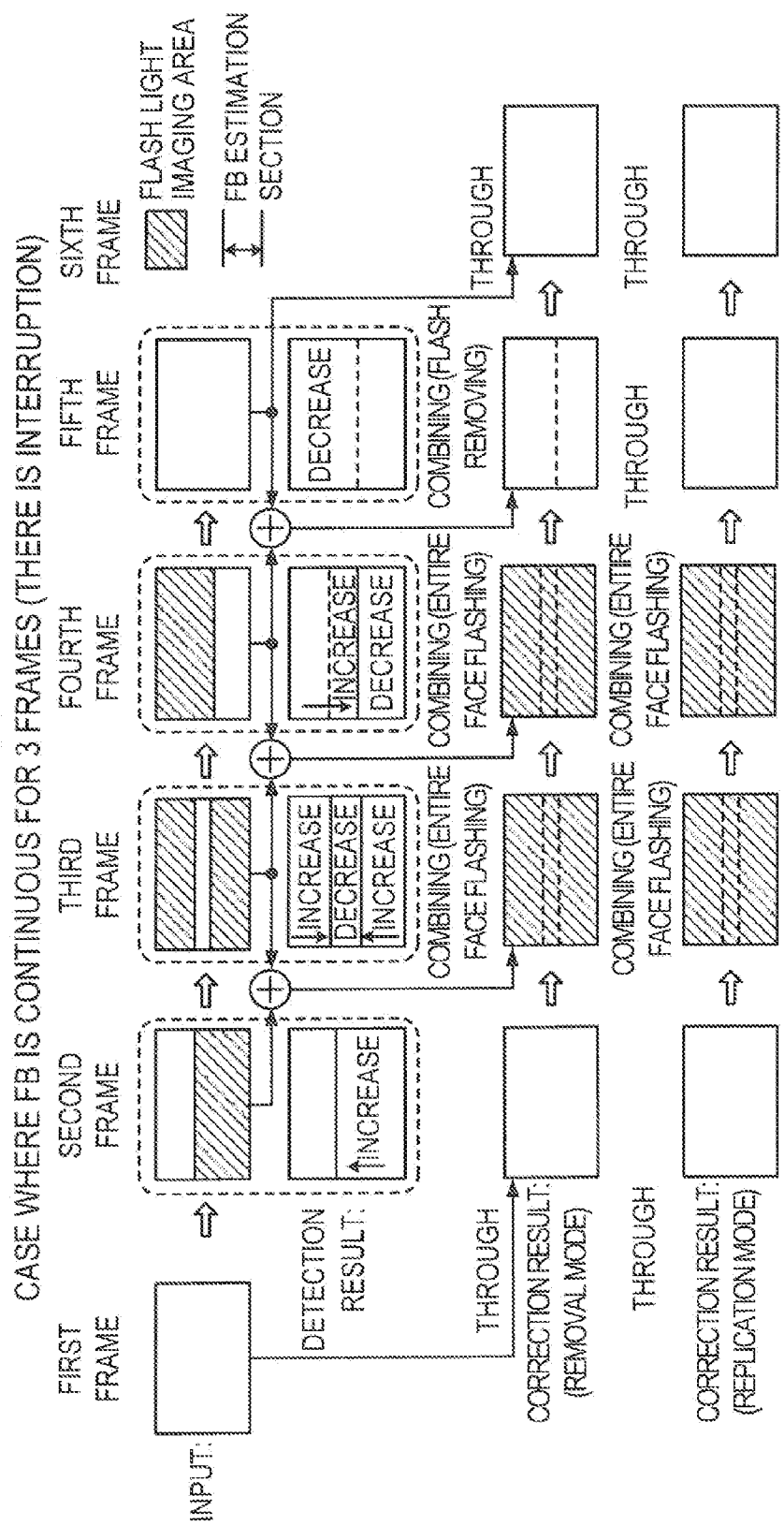

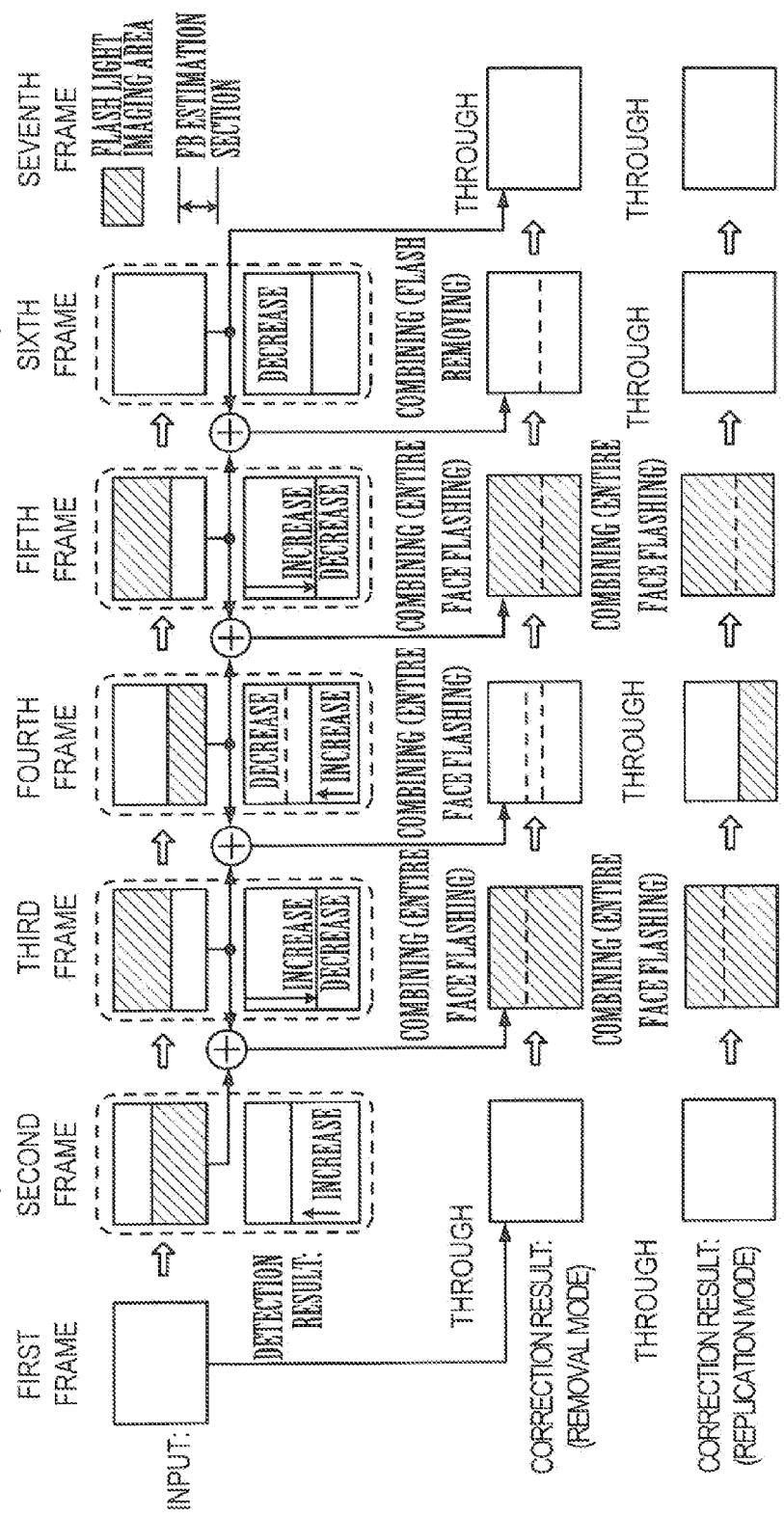

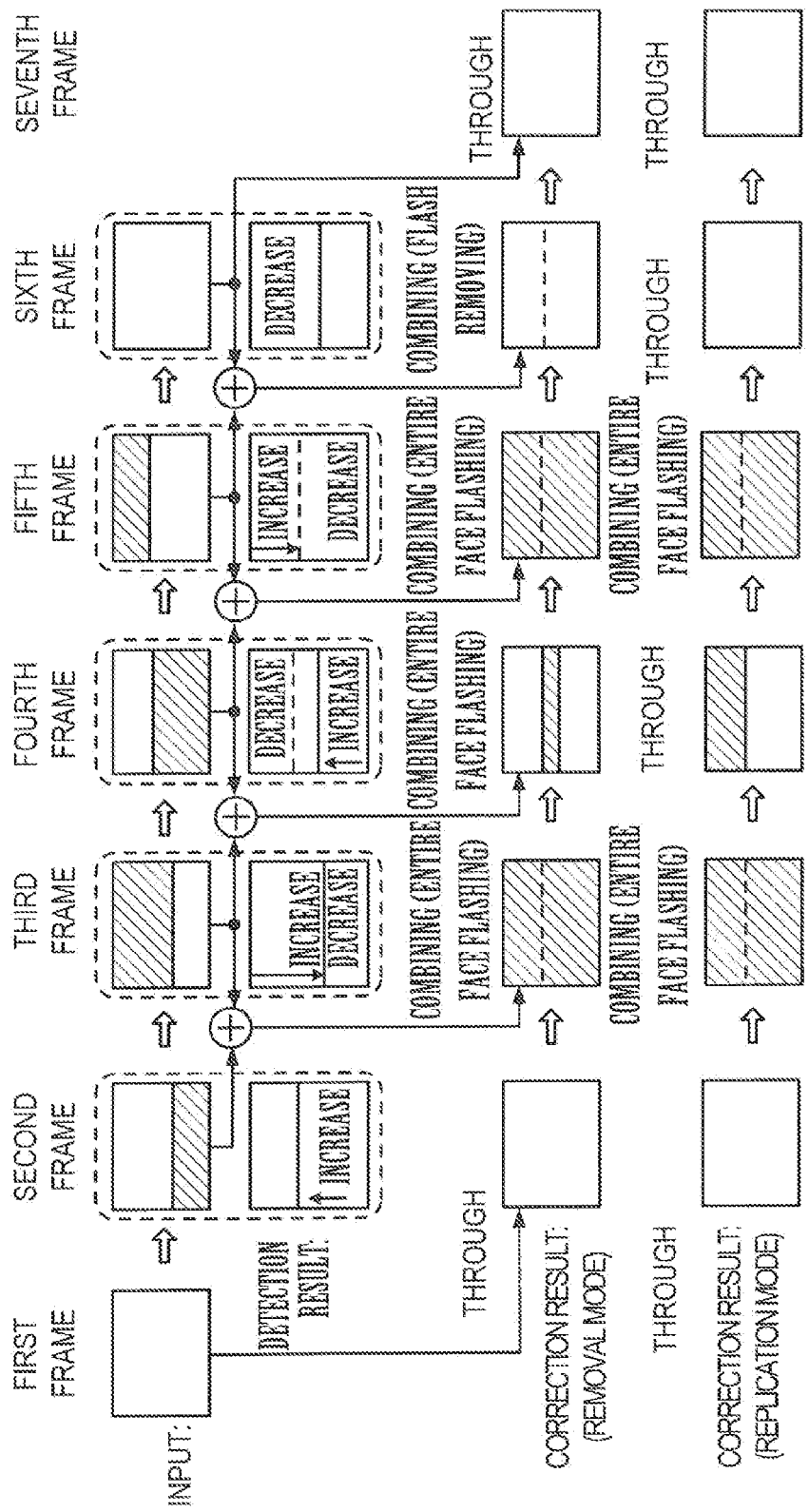

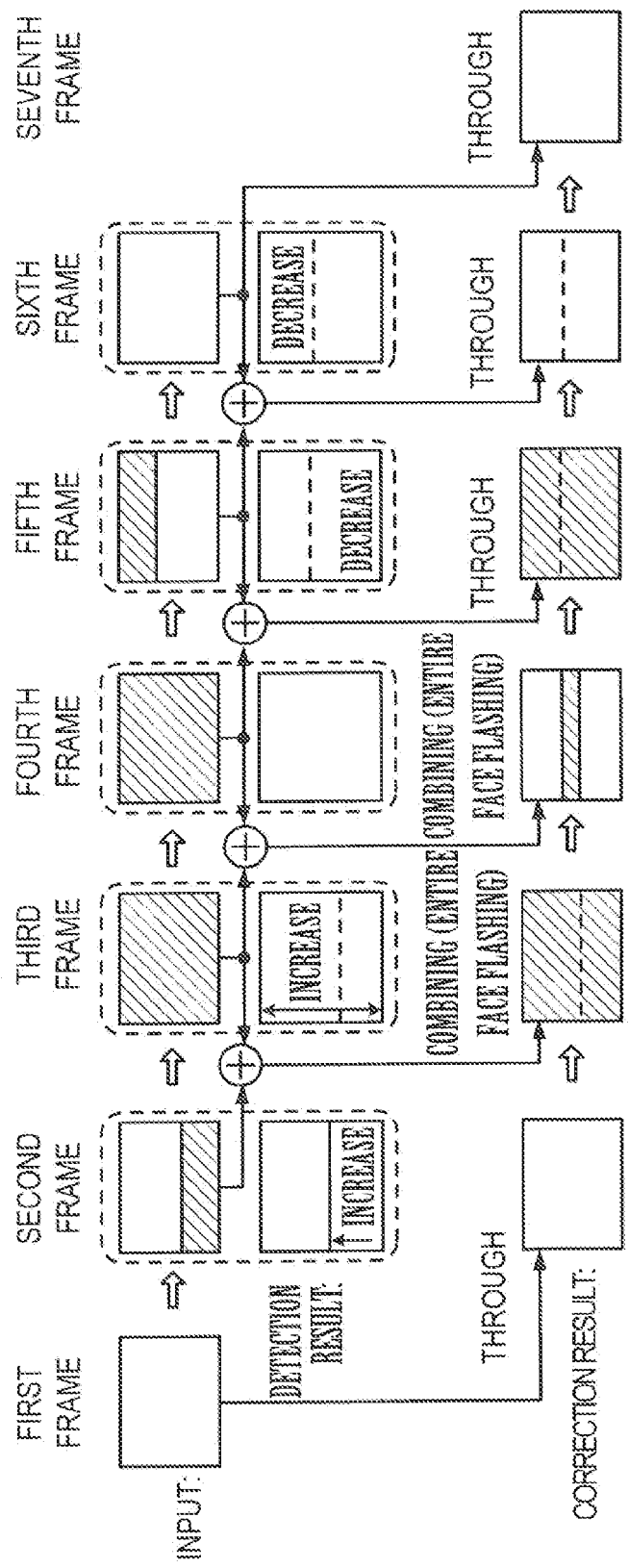

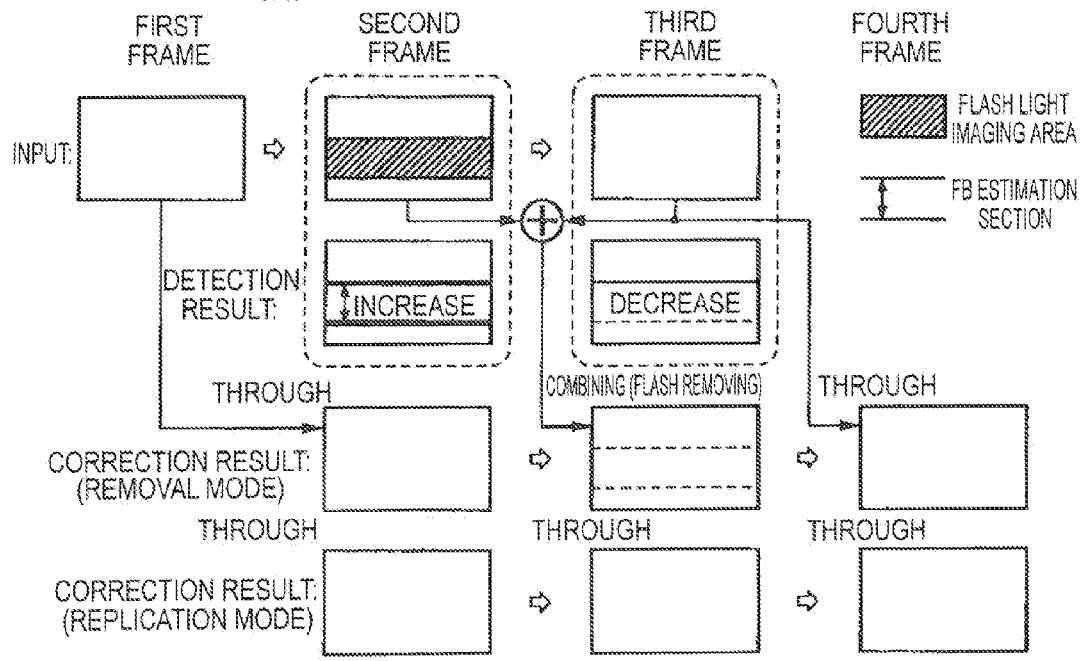
FIG. 14
CASE WHERE FB IS COMPLETED WITHIN 1 FRAME
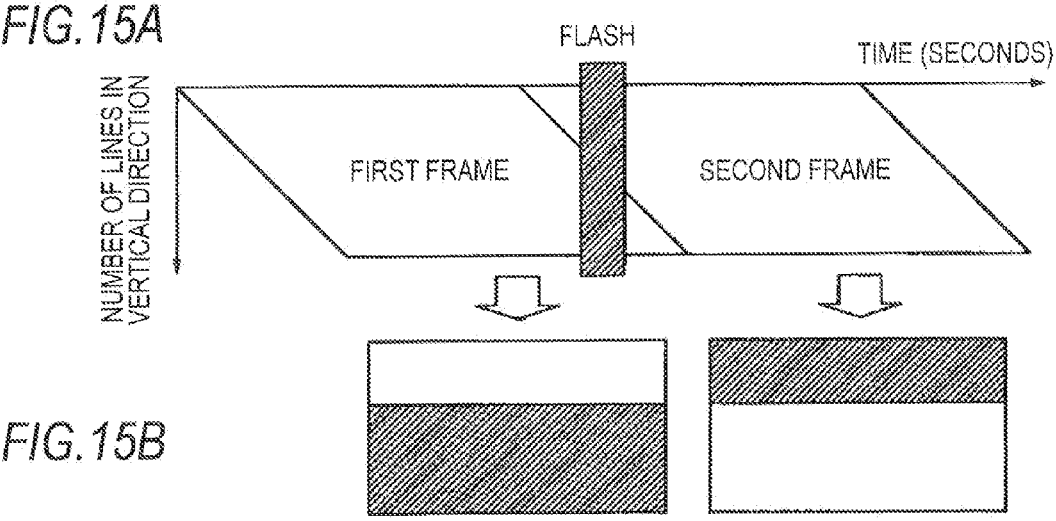
FIG. 15A
FIG. 15B

IMAGING APPARATUS AND IMAGING PROCESSING METHOD FOR DETECTING AND CORRECTING FLASH BAND

FIELD

The present disclosure relates to a flash band processing circuit, a method of processing a flash band, an imaging apparatus, and an imaging processing method that can be applied in a case where a flash band generated within a video, which is, for example, acquired by imaging a subject by emitting strong light (hereinafter, rerred to as a "flash") to the subject, is detected.

BACKGROUND

In the related art, as imaging devices used in cameras, imaging devices employing a rolling shutter system are known in which exposure is sequentially started for each horizontal line (hereinafter, referred to as a "line"), and a frame is generated by sequentially reading out video signals for each line. In the imaging device employing the rolling shutter system, an exposure period differs for each line. Accordingly, in a case where a flash or the like is on during a period shorter than a frame rate at which the imaging device reads out a video signal, there is a case where a band-shaped difference (flash band) in the luminance level is generated in a video displayed in accordance with a video signal within a read-out frame. Hereinafter, the luminance level is abbreviated to "level", and a flash band is abbreviated to "FB".

FIGS. 15A and 15B are schematic diagrams illustrating an example of an FB that is generated in a frame in the related art.

In FIG. 15A, the vertical axis represents the number of lines in the vertical direction, the horizontal axis represents the time (seconds), and the relationship between consecutive frames and a flash is illustrated.

An imaging device reads out video signals in the order from the side on which the number of lines in the vertical direction is small (in this example, a direction from the upper portion of a frame to the lower portion) and outputs the video signals. Over the first frame to the second frame, the flash is on.

FIG. 15B illustrates an example of videos for each frame.

When the flash is on from the first frame to the second frame, the flash has no effect on upper lines of the first frame that have already been read out, but a difference in the level is generated in lower lines of the first frame due to the effect of the flash. In the second frame, video signals of upper lines of the second frame are read out before a video signal of the lower-most line of the first frame is read out. Accordingly, a difference in the level is generated due to the effect of the flash in the upper lines of the second frame, but the flash has no effect on the lower lines of the second frame. As above, when the FB is generated in a frame, a lower portion of a video is brightened in the first frame, and an upper portion of a video is brightened in the second frame. Since the FBs are generated over a plurality of frames and the FBs are seen when a video is reproduced or a still screen is captured, the quality of the video may deteriorate.

In the related art, in order to suppress the effect of a frame in which an FB is generated on a video, a countermeasure such as correction of the frame for removing the difference in the level or discarding the frame is taken. As a premise of such a countermeasure, a method of detecting whether or not there is an FB has been reviewed.

In JP-A-2010-135921, as a method of detecting the FB, a method using a first condition that the presence of an area, in which the level of a pixel increases in the lower portion of a first frame and the upper portion of a second frame as a typical feature of the FB, is detected is disclosed. In this method, a decrease in the level of an area, of which the level increases in the first frame, in the second frame is set as a second condition. By adding the second condition to the first condition, incorrect detection of the generation of the FB in a case where the first condition is satisfied due to only the composition of a subject can be prevented.

In addition, as another method, in JP-A-2007-306225, a method is disclosed in which a frame, in which the exposure is saturated, is detected from among a group of consecutive frames acquired through imaging under appropriate exposure.

SUMMARY

In the method of detecting an FB that is disclosed in JP-A-2010-135921, it is difficult to detect a case where a start line and an end line of an FB fall into one frame (hereinafter, such an FB state is referred to as "an FB is completed") or a case where an FB is continuous over three or more frames. In addition, in this method, a video signal of a line is read out from the upper portion of a frame toward the lower portion. Accordingly, when an object having high luminance moves from the lower portion of a frame to the upper portion, there is a possibility that an FB is incorrectly detected due to the object displayed in the lower portion of the first frame and the object displayed in the upper portion of the second frame. Furthermore, even when there are many flashes on for the subject in a short period as in a news report program or the like, whereby FBs are generated in a plurality of spots within consecutive frames, it is difficult to specify the positions of the FBs within the frames.

In addition, in the method of detecting an FB that is disclosed in JP-A-2007-306225, in a case where the position of a moving body or a light source that has high luminance changes, there is a possibility that the generation of an FB will be incorrectly detected due to the moving body or the light source of which the position has changed.

Thus, it is desirable to appropriately detect an FB that is generated in a frame.

In an embodiment of the present disclosure, the start line and the end line of a flash band are detected based on a difference in the exposure periods of video signals for each line that are output for each frame by pixels included in an imaging device of a rolling shutter system.

Accordingly, the start line and the end line of an FB generated in a frame can be detected.

According to the embodiment of the present disclosure, by detecting the start line and the end line of an FB generated in a frame, detailed information necessary for correcting the FB can be acquired. Therefore, there is an advantage that an appropriate FB correcting process can be performed only for the detected FB as a target.

BRIEF DESCRIPTION OF THE DRAWINGS

FIG. 11 is a schematic diagram illustrating an example of output frames in a case where FBs are generated consecutively in two frames, according to an embodiment of the present disclosure.

FIGS. 12A and 12B are schematic diagrams illustrating an example of output frames in a case where FBs are generated consecutively in three frames, according to an embodiment of the present disclosure.

FIGS. 13A to 13C are schematic diagrams illustrating an example of output frames in a case where FBs are generated consecutively in four or more frames, according to an embodiment of the present disclosure.

FIG. 14 is a schematic diagram illustrating an example of output frames in a case where an FB is completed within one frame, according to an embodiment of the present disclosure.

FIGS. 15A and 15B are schematic diagrams illustrating an example of an FB generated in frames in the related art.

DETAILED DESCRIPTION

Hereinafter, modes of implementing the present disclosure (hereinafter, referred to as embodiment) will be described. The description will be presented in the following order.

1. Embodiment (Example of process in which FB is detected, and FB is corrected)

2. Modified Examples

<1. Embodiment>

[Example of Process in which FB is Detected, and FB is Corrected]

Hereinafter, an embodiment of the present disclosure will be described with reference to FIGS. 1 to 14. In this embodiment, an example (hereinafter, referred to as "this example") of a video signal processing circuit 3 that detects an FB generated in a frame and corrects the detected FB and an imaging apparatus 1 including the video signal processing circuit 3 will be described.

Figure 1:
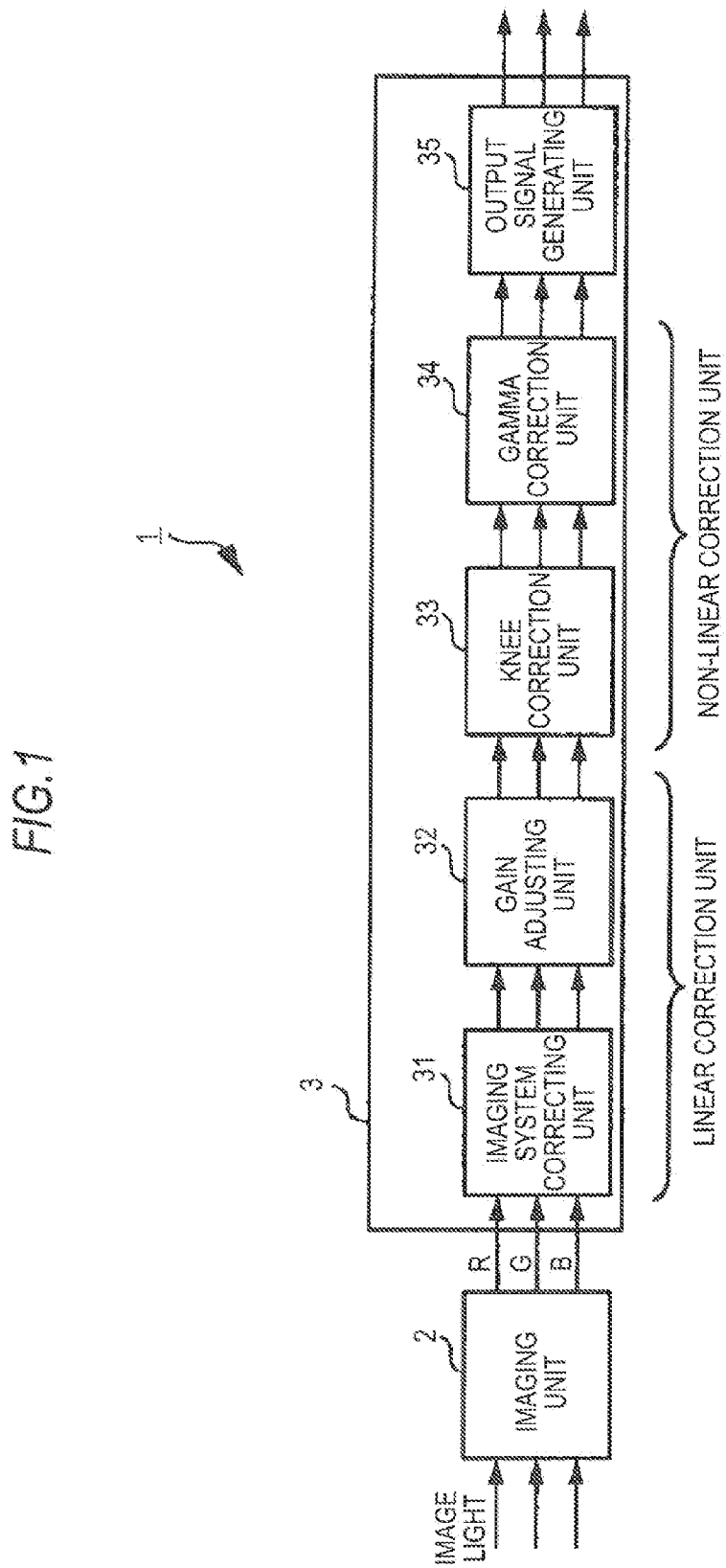
FIG. 1 is a block diagram illustrating an example of the internal configuration of an imaging apparatus according to an embodiment of the present disclosure.

FIG. 1 illustrates an example of the internal configuration of an imaging apparatus 1 of this example.

First, an imaging apparatus 1 employing a general camera system will be described. The technology relating to the present disclosure is also applied to an imaging processing method used in the imaging apparatus 1.

The imaging apparatus 1 includes an imaging unit 2 that includes an imaging device of a rolling shutter system, a lens system, and the like and outputs video signals of three primary colors and a video signal processing circuit 3 that performs a predetermined process for the video signals received from the imaging unit 2. As this imaging device, for example, a CMOS (Complementary Metal Oxide Semiconductor) sensor is used. The imaging device, the lens system, and the like that are included in the imaging unit 2 are not illustrated in the figure.

The imaging device exposes image light of a subject that is incident through the lens system for each pixel and reads out video signals for each line. There is a case where an FB, which is a difference in the levels of lines within a frame due to flash, is generated based on a difference for each line in the exposure periods of video signals output by pixels included in the imaging device for each frame. Then, the imaging unit 2, by using an A/D (Analog/Digital) conversion unit, converts a video signal read out by the imaging device from an analog signal into a digital signal, thereby generating a quantized video signal.

The video signal processing circuit 3 includes an imaging system correcting unit 31 that corrects a defect of a video signal received from the imaging unit 2 and a gain adjusting unit 32 that adjusts the gain and the like of a video signal in accordance with an instruction, which is made by a user or the like, transmitted from an operation unit that is not shown in the figure. In this example, the imaging system Correcting unit 31 and the gain adjusting unit 32 are combined so as to be used as a linear correction unit that performs linear correction of a video signal.

A flash band detecting circuit 10 (see FIG. 2) to be described later detects the presence of an FB and the start line and the end line of the FB and is preferably mounted in the imaging system correcting unit 31 or the gain adjusting unit 32. The flash band detecting circuit 10 according to the embodiment of the present disclosure and a flash band correcting circuit 17 included in the linear correction unit detect the start line and the end line of an FB generated within a frame and are used as a flash band processing circuit that corrects an FB and a method of processing a flash band. In addition, the flash band correcting circuit 17 is used as a flash band correcting unit.

In addition, the flash band processing circuit detects the generation of an FB within a current frame that is currently output by the imaging device. Furthermore, the flash band processing circuit detects the generation of an FB over a past frame that was output by the imaging device a predetermined number of frames before the current frame to the current frame. In the description presented below, the video of the current frame is abbreviated to a "current frame", and the video of the past frame is abbreviated to a "past frame".

In addition, the video signal processing circuit 3 includes a knee correction unit 33 that performs knee correction of a video signal and a gamma correction unit 34 that performs gamma correction of a video signal. The knee correction unit 33 and the gamma correction unit 34 are combined so as to be used as a non-linear correction unit that performs non-linear correction of a video signal. Furthermore, the video signal processing circuit 3 includes an output signal generating unit 35 that outputs an output signal that is used for outputting a video signal received from the gamma correction unit 34 to an external recording medium (a flash memory, an HDD, or the like).

The video signals of three primary colors R, G, and B that are output by the imaging unit 2 are appropriately linearly processed by the imaging system correcting unit 31 and the gain adjusting unit 32 and then the levels thereof are compressed by the knee correction unit 33 so as to be set in a predetermined signal specification. In addition, in order to correspond to the gamma of a monitor such as a CRT (Cathode Ray Tube) from which the video signal is output, the gamma correction unit 34 performs gamma correction of the video signal. Thereafter, the output signal generating unit 35 converts the video signal into a final output format for outputting it to the monitor or the like and outputs the converted video signal.

Figure 2:
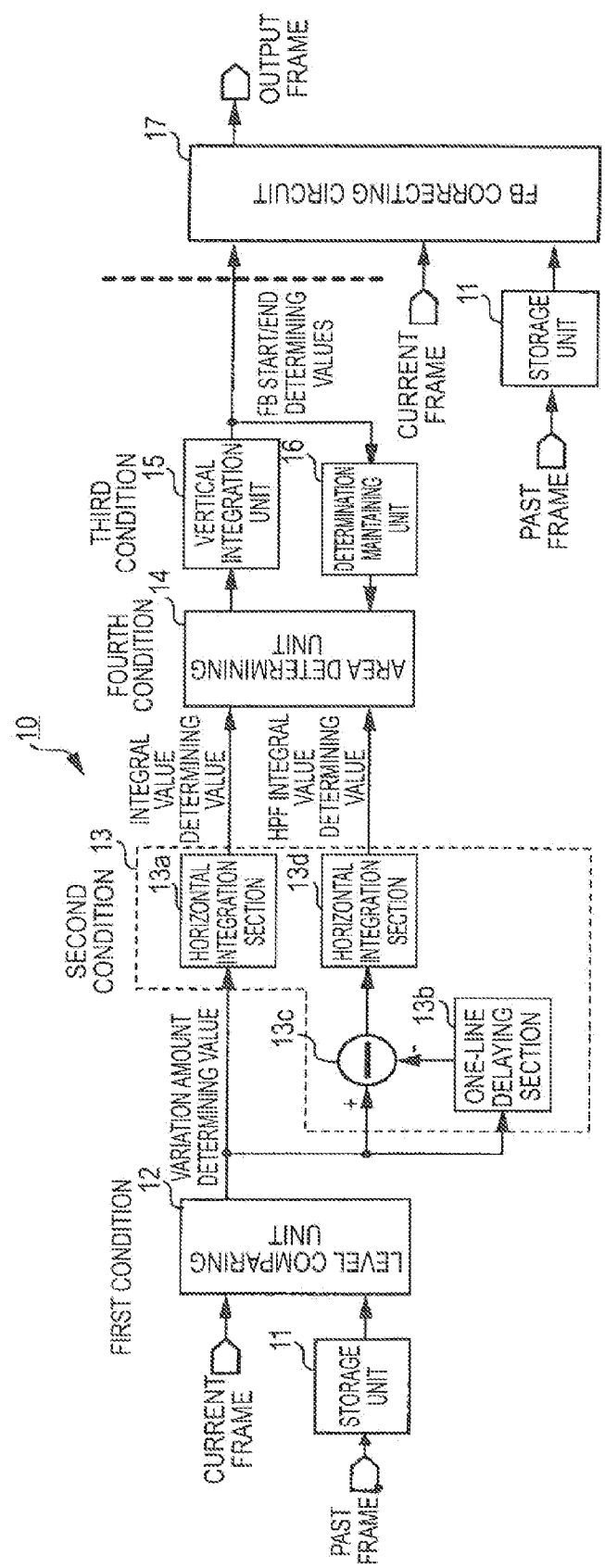
FIG. 2 illustrates an example of the internal configuration of a flash band detecting circuit that detects an FB generated within a frame according to an embodiment of the present disclosure.

FIG. 2 illustrates an example of the internal configuration of the flash band detecting circuit 10 that detects an FB generated within a frame and the flash band correcting circuit 17.

The flash band detecting circuit 10 compares levels between frames in which the current frame and the past frame are continuous for each pixel so as to acquire a comparison result, specifies a horizontal line in which the amount of variation of the level is large based on the comparison result, and detects a line that is a boundary between consecutive horizontal lines in which the amount of variation is large and horizontal lines in which the amount of variations is small, thereby detecting the generation of a flash band.

The flash band detecting circuit 10 includes a recording unit 11 that records a past frame and a level comparing unit 12 that compares the levels of the current frame and the past frame. In addition, the flash band detecting circuit 10 includes the horizontal integration unit 13 that receives a variation amount determining value (0 or 1) that is a result of determining the variation of the level for each pixel from the level comparing unit 12 for each pixel and calculates the integral of the current frame for each line in the horizontal direction. Hereinafter, the variation of the level is referred to as a "level variation", and the amount of variation of the level is referred to as a "level variation amount".

The horizontal integration unit 13 includes two types of horizontal integration sections 13a and 13d. The horizontal integration section 13a directly integrates the variation amount determining value output from the level comparing unit 12 in the horizontal direction. On the other hand, the horizontal integration section 13d includes a one-line delaying section 13b that stores the variation amount determining value for one line in the horizontal direction and a subtraction section 13c that subtracts the variation amount determining value for one line that is delayed by the one-line delaying section 13b from the variation amount determining value of the current line that is read out from the level comparing unit 12 as a processing target.

In addition, the flash band detecting circuit 10 includes an area determining unit 14 that determines an increase or decrease in the level of the area in which an FB is generated from the level of the past frame based on the integral value determining value in the horizontal direction and an FB start line determining value and an FB end line determining value that are received from a determination maintaining unit 16 to be described later.

In addition, a vertical integration unit 15 is included which integrates the number of lines of which the area is determined as an increase area determining value or a decrease area determining value (see FIG. 7 to be described later) output by the area determining unit 14 with respect to each various amount determining value. The vertical integration unit 15 outputs an "FB start determining value" indicating the determination of the start of an FB or an "FB end determining value" indicating the determination of the end of an FB to the determination maintaining unit 16 and the flash band correcting circuit 17. The FB start determining value is represented by 0 or 1. When the FB start determining value is 0, it indicates that an FB has not been started. On the other hand, when the FB start determining value is 1, it indicates that an FB has been started. In addition, the FB end determining value is represented by 0 or 1. When the FB end determining value is 0, it indicates that an FB has not been ended. On the other hand, when the FB end determining value is 1, it indicates that an FB has been ended.

In addition, the flash band detecting circuit 10 includes the determination maintaining unit 16 that determines whether or not the current frame is in the middle of a FB period based on the FB start determining value or the FB end determining value (hereinafter, abbreviated to an "FB start/end determining value). This determination maintaining unit 16 maintains the determination result over one line or one frame period. Then, the determination maintaining unit 16 acquires an "FB start line determining value" and an "FB end line determining value" as a result of the determination of the start line and the end line of the FB and outputs the FB start line determining value and the FB end line determining value to the area determining unit 14.

The flash band processing circuit includes a flash band correcting circuit 17 that outputs an output frame acquired by correcting the FB included in the current frame and the past frame based on the FB start/end determining value received from the vertical integration unit 15. The flash band correcting circuit 17 performs FB correction based on a removal mode or a replication mode that is set in advance. Here, a processing mode in which the entire face flashing process, a flash removing process, and a through output, to be described later, are performed is referred to as a "removal mode, and a processing mode in which the entire flash processing and the through output are performed is referred to as a "replication mode". Then, the flash band correcting circuit 17 outputs the frame of which the FB is corrected in accordance with the processing mode as an output frame.

Next, an example of the operation of each unit will be described.

The level comparing unit 12 acquires the ratio of luminance levels of a pixel that is located at a specific position (in this example, the same position (x, y)) in the current and past frames as a level variation ratio. Then, as a value indicating whether or not the amount of variation of the level of the pixel located at the same position (x, y) in the current frame and the previous frame is larger than a predetermined threshold value, the level comparing unit 12 outputs a "variation amount determining value" of "0" in a case where the variation amount is small and outputs a "variation amount determining value" of "1" in a case where the variation amount is large.

As a value indicating whether or not the absolute value of the integrated value acquired by integrating each line is larger than a predetermined threshold value, the horizontal integration section 13a outputs an "integrated value determining value" of 0 in a case where the integrated value is smaller than the threshold value and outputs an "integrated value determining value" of 1 in a case where the integrated value is larger than the threshold value. In addition, the horizontal integration unit 13 outputs an "integrated value sign" that represents whether the sign of the integrated value is positive or negative.

The area determining unit 14 acquires an increased area and a decreased area based on the integrated value determining value and the integrated value sign that are input from the horizontal integration unit 13, an "FB start line determining value" or an "FB end line determining value" that represents the start line or the end line of the FB and is input from the determination maintaining unit 16, and the like. Hereinafter, the "FB start line determining value" or the "FB end line determination value" is abbreviated to an "FB start/end line determining value". The area determining unit 14 outputs an "increased area determining value" in a case where an increased area is included in the current frame and outputs a "decreased area determining value" in a case where a decreased area is included in the current frame. Here, an area in which the level of the pixel in the current frame is higher than the level of the pixel at the same position in the previous frame is referred to as an "increased area", and an area in which the level of the pixel in the current frame is lower than the level of the pixel in the past frame is referred to as a "decreased area".

The vertical integration unit 15 adds the number of lines determined as increased areas in the vertical direction of the current frame or the number of lines determined as decreased areas. Then, when the added number of the lines exceeds a predetermined threshold value, the vertical integration unit 15 outputs an FB start/end determining value that indicates the determination of the start or the end of an FB to the determination maintaining unit 16 and the flash band correcting circuit 17. A process of determining whether or not it is during an FB period will be described later.

The determination maintaining unit 16 outputs an FB start/end line determining value to the area determining unit 14 based on the FB start/end determining value input from the vertical integration unit 15. In addition, the determination maintaining unit 16 outputs a value determining whether the FB start/end line determining values are "during an FB period" or "not during an FB period" to the area determining unit 14.

The flash band correcting circuit 17 corrects the FB based on the FB start/end determining values received from the vertical integration unit 15 by using the current frame and the past frame read out from the recording unit 11 and outputs an output frame. The FB correcting process performed by the flash band correcting circuit 17 will be described in detail later with reference to FIGS. 8 to 14 to be described later.

In the embodiment of the present disclosure, the conditions for determining an FB are the following four conditions.
First Condition: A level variation of a pixel located at the same position in the current frame and the previous frame (past frame) is large (the level comparing unit 12).
Second Condition: There are many pixels satisfying the first condition in one line (the horizontal integration unit 13).
Third Condition: The lines satisfying the second condition are consecutive in the vertical direction (the vertical integration unit 15).
Fourth Condition: A high frequency component in the vertical direction is present in a leading line out of a group of lines satisfying the third condition (the area determining unit 14).

In a case where an FB is generated in a frame, after a group of lines (an area in which flash is imaged) of which the levels change in a positive direction increasing the luminance levels from those of a past frame appears in the current frame, a group of lines of which the levels changes (restoring to the original levels) in a negative direction decreasing the luminance levels appears in the current frame. Accordingly, among the group of lines satisfying the first to fourth conditions, the generation of an FB can be estimated to be generated in an area having a boundary at which the levels change from the positive direction to the negative direction.

The fourth condition is used for preventing incorrect detection of a high-luminance moving body of which the level changes within a frame due to its movement over a plurality of frames as an FB. In the fourth condition, it is used that there is a difference in the level between a line imaged during a period in which flash is on and a line imaged during a period in which flash is not on in the case of an FB, but there is no difference in the level in the case of a moving body. Accordingly, by detecting the presence of a high-frequency component in the vertical direction within a frame by using the fourth condition, flash and a moving body can be identified from each other.

Next, an example of the internal configuration of each unit of the flash band detecting circuit 10 and an example of the operation thereof will be described.

Figure 3:
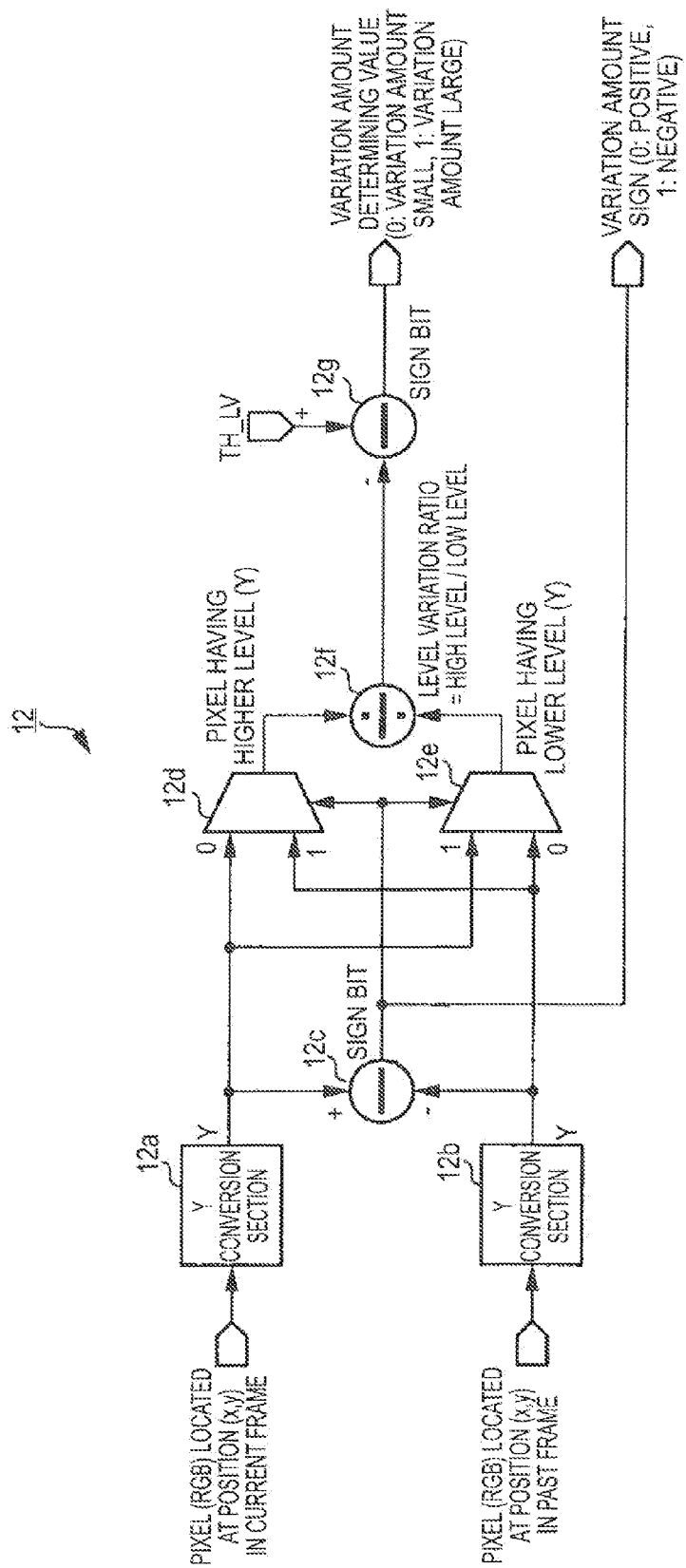
FIG. 3 is a block diagram illustrating an example of the internal configuration of a level comparing unit according to an embodiment of the present disclosure.

FIG. 3 is a block diagram illustrating an example of the internal configuration of the level comparing unit 12.

The level comparing unit 12 compares the levels of each pixel in the current frame and the past frame, thereby determining the first condition.

The level comparing unit 12 includes a Y conversion section 12a that converts a video signal of the current frame output for each pixel into a pixel value Y of each pixel and a Y conversion section 12b that converts a video signal of the past frame output for each pixel into a pixel value Y of each pixel. In addition, the level comparing unit 12 includes a subtraction circuit 12c that subtracts the luminance value Y input from the Y conversion section 12a from the luminance value Y input from the Y conversion section 12b. Furthermore, the level comparing unit 12 includes selection sections 12d and 12e each selecting one of luminance values Y output by the Y conversion sections 12a and 12b and inputting the selected luminance value and a dividing circuit 12f that acquires a "level variation ratio by dividing the level of the luminance value Y output by the selection section 12d by the level of the luminance value Y output by the selection section 12e. In addition, the level comparing unit 12 includes a subtraction circuit 12g that outputs a determination result of determining the variation amount of the pixel value Y for each pixel based on the current frame and the past frame by subtracting the level variation ratio acquired by the dividing circuit 12f from a first threshold value TH_LV.

Next, an example of the operation of the level comparing unit 12 will be described.

The level comparing unit 12 acquires the ratio of the luminance levels of a pixel at a specific position in the current and past frames as a level variation ratio and acquires a level variation amount that represents whether the level variation ratio is equal to or higher than the first threshold value (TH_LV) as a variation amount determining value.

More specifically, the Y conversion sections 12a and 12b convert video signals of each pixel of the current frame and the past frame, which are input to the level comparing unit 12, into luminance values Y, and the subtraction circuit 12c decreases the luminance values Y of each pixel in the current frame and the past frame. Here, the subtraction circuit 12c outputs "0" as a sign bit in a case where the subtraction result is positive, and outputs "1" in a case where the subtraction result is negative. Then, the Y conversion section 12a inputs the luminance value Y to an input port 0 of the selection section 12d and an input port 1 of the selection section 12e. In addition, the Y conversion section 12b inputs the luminance value Y to an input port 1 of the selection section 12d and an input port 0 of the selection section 12e.

Each one of the selection sections 12d and 12e selects and outputs the luminance value Y of each pixel in the current frame or the past frame, which is input to input port 0 or 1 from the Y conversion section 12a or 12b, based on the subtraction result of the subtraction circuit 12c. Here, when the sign bit input from the subtraction circuit 12c is "0", the magnitude of the luminance value Y of the current frame is larger than that of the past frame, and accordingly, the selection section 12d outputs the luminance value Y of the current frame, and the selection section 12e outputs the luminance value Y of the past frame. The selection section 12d outputs the luminance value Y input to the input port 0 in a case where the sign input from the subtraction circuit 12c is "0" and outputs the luminance value Y input to the input port 1 in a case where the sign is "1". On the other hand, when the input sign bit is "1", the luminance value Y of the past frame is larger than that of the current frame, and accordingly, the selection section 12d outputs the luminance value Y of the past frame, and the selection section 12e outputs the luminance value Y of the current frame. The selection section 12e outputs the luminance value Y input to the input port 0 in a case where the sign input from the subtraction circuit 12c is "0", and outputs the luminance value Y input to the input port 1 in a case where the sign is "1".

The dividing circuit 12f acquires a ratio of the level of the luminance value Y of the pixel having a higher level that is output from the selection section 12d to the level of the luminance value Y of the pixel having a lower level that is output from the selection section 12e as a "level variation ratio". The level variation ratio shown in the figure is approximately recorded as "a higher level/a lower level". Then, the dividing circuit 12f outputs the level variation ratio not only to the subtraction circuit 12g but also to the flash band correcting circuit 17.

In a case where the level variation ratio is higher than the threshold value TH_LV, the subtraction circuit 12g outputs the presence of a pixel satisfying the first condition with being included in the variation amount determining value. This variation amount determining value is output as "0" in a case where the amount of variation of the levels of the pixel at the same position in the current frame and the past frame is small and is output as "1" in a case where the amount of variation is large. In addition, the subtraction circuit 12c outputs a "variation amount sign" as the direction of the variation that represents one of a positive level variation amount and a negative level variation amount. This variation amount sign is positive in a case where the level of the pixel included in the current frame is higher than that in the past frame and is set to "0". On the other hand, the variation amount sign is negative in a case where the level of the pixel included in the past frame is higher than that in the current frame and is set to "1".

Next, the horizontal integration unit 13 integrates the variation amount determining value output by the level comparing unit 12 for each line in the horizontal direction so as to determine the second condition.

Figure 4:
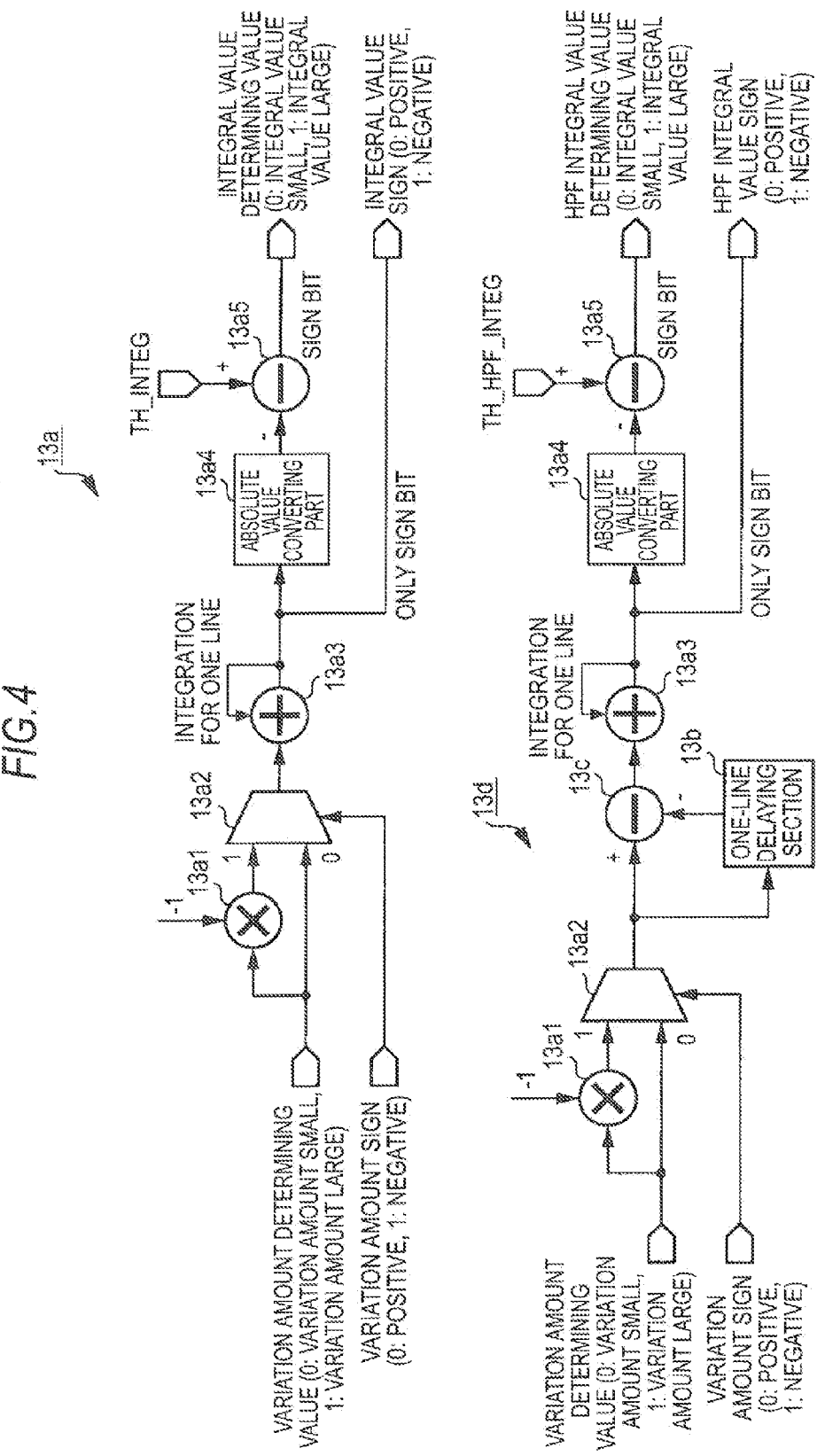
FIG. 4 is a block diagram illustrating an example of the internal configuration of a horizontal integration unit according to an embodiment of the present disclosure.

FIG. 4 is a block diagram illustrating an example of the internal configuration of the horizontal integration unit 13.

The horizontal integration unit 13 includes a horizontal integration section 13a that acquires an integral value by integrating the variation amount determining value of a pixel having larger variation amount for each one line in the horizontal direction. In addition, the horizontal integration unit 13 includes a horizontal integration section 13d that acquires an integral value by integrating the variation amount determining value passing through a high pass filter for each one line. In a case where the variation amount determining value is "0", the integral value acquired by integrating for each line by using the horizontal integration section 13a is "0". On the other hand, in a case where the variation amount determining value is "1", as a result of the integration of the variation amount determining value, the integral value is the same as the number of pixels having a larger variation amount.

The horizontal integration section 13a includes a multiplication part 13a1 that multiplies the variation amount determining value input from the level comparing unit 12 by −1. In addition, the horizontal integration section 13a includes a selection part 13a2 that inputs the variation amount determining value acquired by multiplying the variation amount determining value input from the level comparing unit 12 by −1 by using the multiplication part 13a1 and outputs the variation amount determining value selected based on the variation amount sign input from the level comparing unit 12. Furthermore, the horizontal integration section 13a includes an addition circuit 13a3 that integrates the variation amount determining value corresponding to one line in the horizontal direction, which is output by the selection part 13a2, and an absolute value converting part 13a4 that converts the integral value into an absolute value. In addition, the horizontal integration section 13a includes a subtraction circuit 13a5 that outputs an "integral value determining value" used for determining the magnitude relationship of the integral value by decreasing the absolute value output by the absolute value converting part 13a4 by the threshold value TH_INTEG.

Next, an example of the operation of the horizontal integration unit 13 will be described.

The horizontal integration section 13a of the horizontal integration unit 13 acquires a horizontal integral value by integrating the variation amount determining value of which the level variation ratio is equal to or higher than the first threshold value (TH_LV) for each pixel included in the horizontal line of the current frame. Then, the horizontal integration section 13a acquires an integral value determining value that indicates whether or not the integral value in the horizontal direction is equal to or larger than a second threshold value (TH_INTEG) and acquires an integral value sign that represents one of a positive sign or a negative sign.

The multiplication part 13a1 included in the horizontal integration section 13a inputs the value acquired by multiplying the variable amount determining value by −1 to the input port 1 of the selection part 13a2. Here, in a case where the variation amount determining value of the pixel satisfying the first condition is 1, the multiplication part 13a1 outputs −1 acquired by multiplying it by −1 to the selection part 13a2. On the other hand, in a case where the variation amount determining value of the pixel satisfying the first condition is 0, the multiplication part 13a1 outputs 0 acquired by multiplying it by −1 to the selection part 13a2. The variation amount determining value is directly input to the input port 0 of the selection part 13a2.

The selection part 13a2 outputs the variation amount determining value input to the input port 0 in a case where the variation amount sign is 0 and outputs the variation amount determining value input to the input port 1 in a case where the variation amount sign is 1. The addition circuit 13a3 acquires an integral value by integrating the variation amount determining value output by the selection part 13a2 corresponding to one line. Here, in a case where the variation amount is small, the variation amount determining value is 0, and the variation amount sign is 0, the integrated value integrated by the addition circuit 13a3 is 0. In a case where the variation amount is large, the variation amount determining value output by the selection part 13a2 in accordance with the variation amount sign is an integral value that is integrated with a positive sign or a negative sign. The addition circuit 13a3 outputs an "integral value sign" as a sign that indicates whether the sign of the integral value is positive or negative. The integral value sign is output as 0 in a case where the integral value is positive and is output as 1 in a case where the integral value is negative.

The absolute value converting part 13a4 calculates the absolute value of the integral value of the positive or negative sign, and the subtraction circuit 13a5 subtracts the absolute value from the threshold value TH_INTEG and determines the magnitude relationship of the absolute value. In a case where the absolute value is sufficiently larger than the threshold value TH_INTEG, the subtraction circuit 13a5 outputs the determination result as an "integral value determining value". Here, the subtraction circuit 13a5 output the integral value determining value as 0 in a case where the absolute value of the integral value is less than the threshold value TH_INTEG and outputs the integral value determining value as 1 in a case where the absolute value of the integral value is equal to or greater than the threshold value TH_INTEG.

The horizontal integration section 13d of the horizontal integration unit 13 performs a process that is similar to that of the horizontal integration section 13a described above, and thus detailed description of each block, to which the same reference numeral as that of the block configuring the horizontal integration section 13a is assigned, is omitted. However, in order to determine a start line (the fourth condition) of the increased area or the decreased area, in the horizontal integration section 13d, a one-line delaying section 13b is disposed between the selection part 13a2 and the addition circuit 13a3. In other words, the horizontal integration section 13d acquires an "HPF integral value" that is acquired by integrating a result of subtracting one variation amount determining value from the other variation amount determining value for each pixel that is included in lines adjacent to each other in the vertical direction and is located at the same position in the horizontal direction. At this time, the subtraction section 13c acquires a difference value by subtracting, from the variation amount determining value acquired for the pixel that is present at the position of coordinates x input to the horizontal integration section 13d, the variation amount determining value acquired for the pixel that is located at the same location in the x direction and is delayed by one line in the y direction. Then, the addition circuit 13a3 acquires an HPF integral value by integrating the difference value for one line. In addition, the horizontal integration section 13d acquires the HPF integral value determining value that indicates whether the HPF integral value is equal to or greater than a fifth threshold value (TH_HPF_INTEG) and acquires the HPF integral value sign that represents the sign of the HPF integration value out of a positive sign and a negative sign.

The reason for disposing the one-line delaying section 13b and the subtraction section 13c in the horizontal integration section 13d is to identify an FB and a video acquired by capturing a moving body having high luminance from each other by using a phenomenon in which a luminance difference differs for each line within a frame of a video acquired by imaging a moving body having high luminance. When an FB is generated, the variation amount of the luminance values Y of pixels included in lines adjacent to each other in the vertical direction is extremely large. However, in a case where a moving body having high luminance is imaged, the variation amount of the luminance values Y of pixels of lines adjacent to each other in the vertical direction is small. Accordingly, by using the one-line delaying section 13b, the subtraction section 13c, and the addition circuit 13a3 as a high pass filter, it is determined whether a high frequency component in the vertical direction is present, and only an FB can be correctly recognized without incorrectly recognizing a video acquired by imaging a moving body having high luminance as an FB.

Thereafter, the subtraction circuit 13a5 compares the absolute value converted by the absolute value converting part 13a4 and the threshold value TH_HPF_INTEG and outputs an "HPF integral value determining value" used for determining the magnitude relationship of the integral value passing through the high pass filter. In addition, the addition circuit 13a3 outputs an "HPF integral value sign" as a sign that indicates whether the sign of the HPF integral value is positive or negative. Since a difference value of variation amount determining values of the current line and a line that is located one line before the current line is an integration target, the HPF integral value determining value can be used for determining whether or not the high frequency component in the vertical direction is present. The HPF integration value determining value is output as 0 in a case where the absolute value of the HPF integral value is less than the threshold value TH_HPF_INTEG and is output as 1 in a case where the absolute value of the HPF integral value is equal to or greater than the threshold value TH_HPF_INTEG. In addition, the sign of the HPF integral value is output as 0 in a case where the HPF integral value is positive, and is output as 1 in a case where the HPF integral value is negative.

Next, the area determining unit 14 determines whether or not the fourth condition is satisfied based on the output result of the horizontal integration unit 13. At this time, the FB determining result that is maintained in the determination maintaining unit 16 is used. Accordingly, first, an example of the configuration and the operation of the determination maintaining unit 16 will be described.

Figure 5:
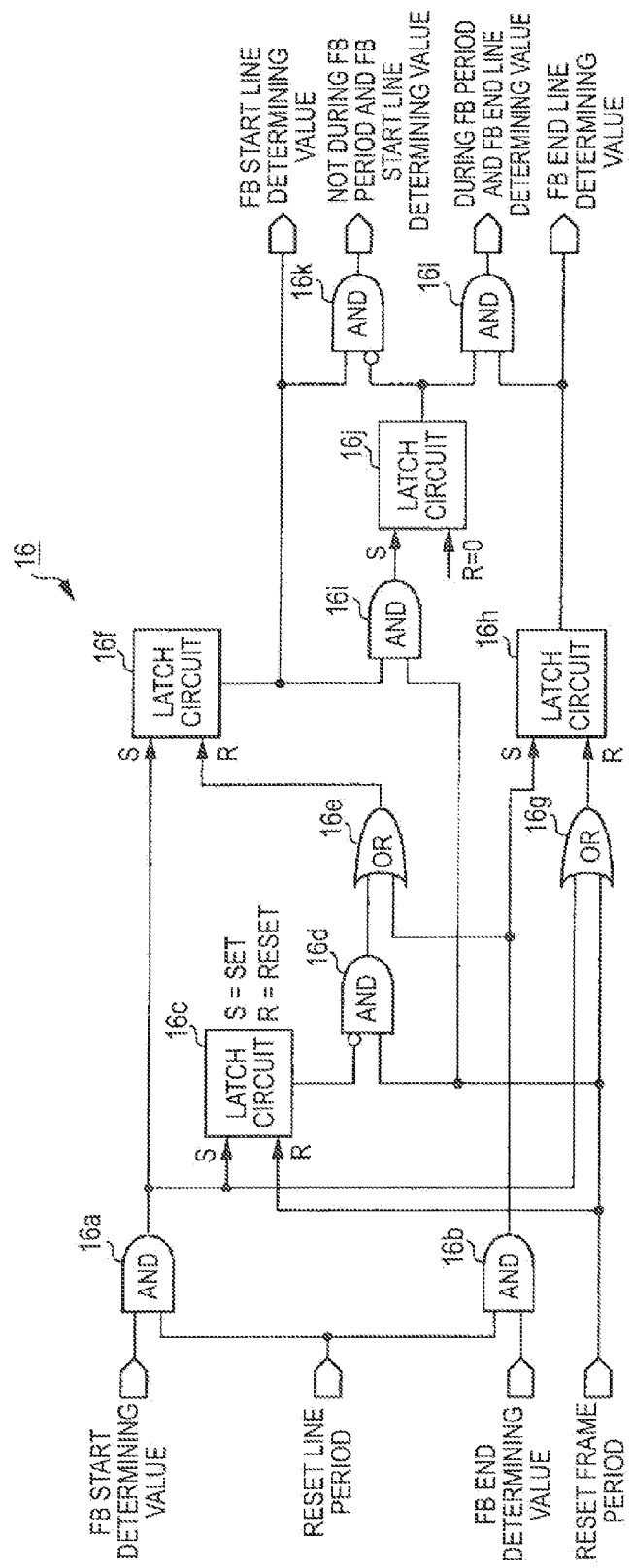
FIG. 5 is a block diagram illustrating an example of the internal configuration of a determination maintaining unit according to an embodiment of the present disclosure.

FIG. 5 is a block diagram illustrating an example of the internal configuration of the determination maintaining unit 16.

The determination maintaining unit 16 includes an AND circuit 16a that takes a logical product of the FB start determining value input from the vertical integration unit 15 and a reset signal of the line period and outputs an FB start determining value for each line. In addition, the determination maintaining unit 16 includes an AND circuit 16b that takes a logical product of the FB end determining value input from the vertical integration unit 15 and the reset signal of the line period and outputs an FB end determining value for each line. Furthermore, the determination maintaining unit 16 includes latch circuits 16c and 16f having S (Set) terminals to which the FB start determining value output by the AND circuit 16a is input. The output of the latch circuit 16f is used as the FB start line determining value that represents an FB start line.

In addition, the determination maintaining unit 16 includes an AND circuit 16d that takes a logical product of an inverted signal of the output signal of the latch circuit 16c and a reset signal of the frame period. Furthermore, the determination maintaining unit 16 includes an OR circuit 16e that takes a logical sum of signals of the AND circuits 16b and 16d and outputs a resultant signal to an R (Reset) terminal of the latch circuit 16f. In addition, the determination maintaining unit 16 includes an OR circuit 16g to which the output signal of the AND circuit 16a and the reset signal of the frame period are input and a latch circuit 16h having an S terminal to which the output signal of the AND circuit 16b is input and an R terminal to which the output signal of the OR circuit 16g is input. The output of the latch circuit 16h is used as the FB end line determining value that represents the FB end line.

Furthermore, the determination maintaining unit 16 includes an AND circuit 16i that takes a logical product of the output signal of the latch circuit 16f and the reset signal of the frame period and a latch circuit 16j having an S terminal to which the output signal of the AND circuit 16i is input. To the R terminal of the latch circuit 16j, 0 is input. In addition, the determination maintaining unit 16 includes an AND circuit 16k that takes a logical product of the output signal of the latch circuit 16f and an inverted signal of the latch circuit 16j and an AND circuit 16l that takes a logical product of the output signals of the latch circuits 16h and 16j. The output signal of the AND circuit 16k is used for representing "not during an FB period and an FB start line determining value". The output signal output by the AND circuit 16l is used for representing "during an FB period and an FB end line determining value".

Next, an example of the operation of the determination maintaining unit 16 will be described.

The determination maintaining unit 16 maintains the FB start determining value and the FB end determining value for a predetermined period based on the line period of the frame and the frame period in accordance with the line period and the frame period. Then, the determination maintaining unit 16 outputs the FB start line determining value representing the determining of the position of the FB start line based on the FB start determining value and outputs the FB end line determining value representing the determining of the position of the FB end line based on the FB end line determining value to the area determining unit 14.

More, specifically, the determination maintaining unit 16 maintains the FB start/end determining value, which is the output result of the vertical integration unit 15, at the line period and the frame period and outputs the FB start/end line determining value based on the FB start/end determining value maintained at the line period. Then, the determination maintaining unit 16 outputs the "not during an FB period and an FB start line determining value" and the "during an FB period and an FB end line determining value" together by combining the FB start/end line determining values maintained at the frame period.

The "not during an FB period and an FB start line determining value" is used for detecting an FB (see FIG. 14) that is completed within one frame. In such a case, the level of the pixel of the current frame corresponding to the tip end of the FB is not changed from the level of the past frame. Accordingly, the tip end of the FB is not a line of which the level changes in the negative direction but a line of which the level does not change. The "during an FB period and an FB end line determining value" is used for detecting that FBs are consecutive, and, immediately after the end of the FB within one frame, the next FB is started (see FIGS. 12A and 12B). In such a case, the level of the pixel of the line corresponding to the start end of the FB started within the current frame is not changed from the level of the current frame. Accordingly, the start end of the FB is not a line of which the level is changed in the positive direction but a line of which the level is not changed.

Next, an example of the configuration and the operation of the area determining unit 14 will be described.

Figure 6:
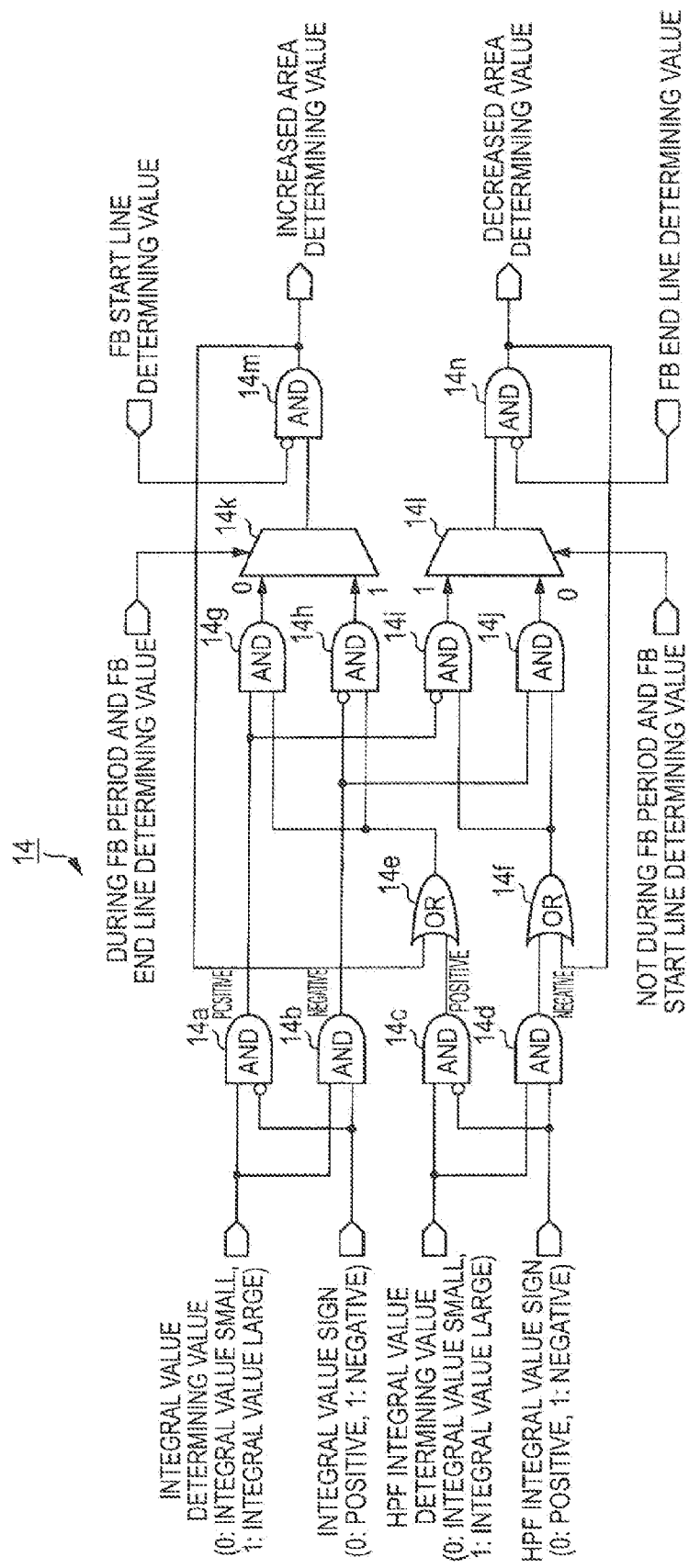
FIG. 6 is a block diagram illustrating an example of the internal configuration of an area determining unit according to an embodiment of the present disclosure.

FIG. 6 is a block diagram illustrating an example of the internal configuration of the area determining unit 14.

The area determining unit 14 includes an AND circuit 14a that takes a logical product of the integral value determining value input from the horizontal integration section 13a and the inverted integral value sign and an AND circuit 14b that takes a logical product of the integral value determining value and the integral value sign. In addition, the area determining unit 14 includes an AND circuit 14c that takes a logical product of the HPF integral value determining value input from the horizontal integration section 13d and the inverted HPF integral value sign and an AND circuit 14d that takes a logical product of the HPF integral value determining value and the HPF integral value sign.

In addition, the area determining unit 14 includes an OR circuit 14e that receives the output signal of the AND circuit 14c and an increased area determining value output from an AND circuit 14m to be described later as inputs and takes a logical product thereof. In addition, the area determining unit 14 includes an OR circuit 14f that receives the output signal of the AND circuit 14d and a decreased area determining value output by an AND circuit 14n to be described later as inputs and takes a logical product thereof.

In addition, the area determining unit 14 includes an AND circuit 14g that receives the output signals of the AND circuit 14a and the OR circuit 14e as inputs and takes a logical product thereof and an AND circuit 14h that receives the inverted output signal of the AND circuit 14b and the output signal of the OR circuit 14e as inputs and takes a logical product thereof. Furthermore, the area determining unit 14 includes an AND circuit 14i that receives the inverted output signal of the AND circuit 14a and the output signal of the OR circuit 14f as inputs and takes a logical product thereof and an AND circuit 14j that receives the output signals of the AND circuit 14b and the OR circuit 14f as inputs and takes a logical product thereof.

In addition, the area determining unit 14 includes a selection section 14k that selects the output signals of the AND circuits 14g and 14h input to the input ports 0 and 1 and outputs the selected output signal based on the input of "during an FB period and an FB end line determining value". Furthermore, the area determining unit 14 includes a selection section 14l that selects the output signals of the AND circuits 14i and 14j input to the input ports 1 and 0 and outputs the selected output signal based on the input of "not-during an FB period and an FB start line determining value". In addition, the area determining unit 14 includes an AND circuit 14m that takes a logical product of the output signal of the selection section 14k and the inverted "FB start line determining value" and an AND circuit 14n that takes a logical product of the output signal of the selection section 14l and the inverted "FB end line determining value". The AND circuit 14m outputs the increased area determining value to the vertical integration unit 15, and the AND circuit 14n outputs the decreased area determining value to the vertical integration unit 15.

Next, an example of the operation of the area determining unit 14 will be described.

In a case where the integration value sign is positive based on the integral value determining value and the integral value sign, the area determining unit 14 outputs the increased area determining value representing the determining of an increased area in which the luminance of the pixel included in the current frame is higher than that included in the past frame. On the other hand, in a case where the integration value sign is negative, the area determining unit 14 outputs the decreased area determining value representing the determining of a decreased area in which the luminance of the pixel included in the current frame is lower than that included in the past frame. In addition, the area determining unit 14 detects whether or not an FB is present based on flash light by determining whether or not a high frequency component in the vertical direction is present within a frame based on the HPF integral value determining value and the HPF integral value sign.

The area determining unit 14 determines an increased area in a case where "during an FB period and an FB end line determining value" is 1, the HPF integral value determining value is 1, and the HPF integral value sign is 0 (positive). This increased area is a group of lines up to a line of which the integral value is 1 (the integral value is large in the negative direction) and after which the integral value determining value is 1. In addition, in a case where "during an FB period and an FB end line determining value" is 0, the HPF integral value determining value is 1, and the HPF integral value sign is 0 (positive), an increased area is determined. This increased area is a group of lines after which the integral value determining value is 1, and the integral value sign is 0 (the integral value is large in the positive direction). The increased area is an area that satisfies the first, second, and fourth conditions and has a level changing in the positive direction (the level not changing in the negative direction).

On the other hand, in a case where "not during an FB period and an FB start line determining value" is 1, the HPF integral value determining value is 1, and the HPF integral value sign is 1, a group of lines after the line up to a line of which the integral value increases in the positive direction is determined as a decreased area. In addition, in a case where "not during an FB period and an FB start line determining value" is 0, the HPF integral value determining value is 1, and the HPF integral value sign is 1, a group of lines after the line up to a line of which the integral value increases in the negative direction is determined as a decreased area. The decreased area is an area that satisfies the first, second, and fourth conditions and has a level changing in the negative direction (or level not changing in the positive direction).

Next, the vertical integration unit 15 determines whether the third condition is satisfied by integrating (counting) a group of consecutive lines based on the output result of the area determining unit 14. Hereinafter, an example of the configuration and the operation of the vertical integration unit 15 will be described.

Figure 7:
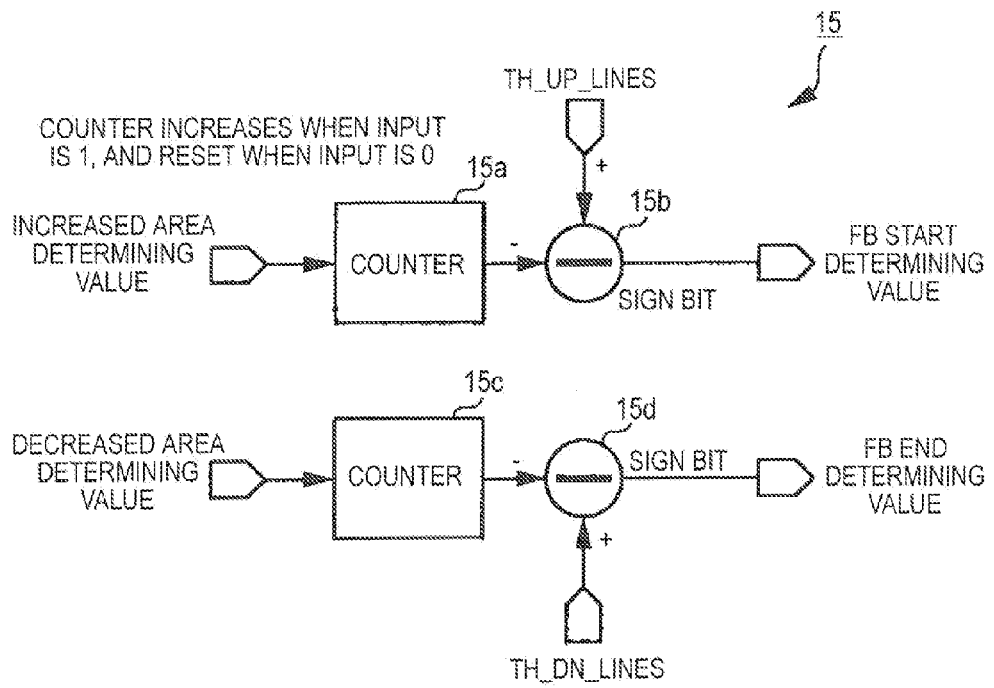
FIG. 7 is a block diagram illustrating an example of the internal configuration of a vertical integration unit according to an embodiment of the present disclosure.

FIG. 7 is a block diagram illustrating an example of the internal configuration of the vertical integration unit 15.

The vertical integration unit 15 includes a counter 15a that integrates the counter value in a case where the increased area determining value input from the area determining unit 14 is 1 and resets the counter value in a case where the increased area determining value is 0 and a subtraction section 15b that acquires a subtracted value by subtracting the counter value from a threshold value TH_UP_LINES. When recognizing that the number of increased areas is greater than the number of lines defined by the threshold value TH_UP_LINES, the subtraction section 15b outputs the FB start determining value. In addition, the vertical integration unit 15 includes a counter 15c that integrates the counter value in a case where the decreased area determining value input from the area determining unit 14 is 1 and resets the counter value in a case where the decreased area determining value is 0 and a subtraction section 15d that subtracts the counter value from a threshold value TH_DN_LINES. When recognizing that the number of increased areas is greater than the number of lines defined by the threshold value TH_DN_LINES, the subtraction section 15d outputs the FB end determining value.

Next, an example of the operation of the vertical integration unit 15 will be described.

At this time, in a case where an increased area determining value integral value acquired by integrating the increased area determining value for each line in the vertical direction is equal to or greater than the third threshold Value (TH_UP_LINES), the vertical integration unit 15 outputs the FB start determining value representing that an FB starts within a frame. In addition, in a case where a decreased area determining value integral value acquired by integrating the decreased area determining value for each line in the vertical direction is equal to or greater than the fourth threshold value (TH_DN_LINES), the vertical integration unit 15 outputs the FB end determining value representing that an FB ends within a frame.

More specifically, the counter 15a counts the number of consecutive lines of which the increased area determining values are 1 (the level changed in the positive direction in an area satisfying the first, second, and fourth conditions). In a case where the counted value is greater than the threshold value TH_UP_LINES, the subtraction section 15b determines the start of an FB and resets the increased area determining value to 0. On the other hand, the counter 15c counts the number of lines of which the decreased area determining value are 1. Then, in a case where the counted value is greater than the threshold value TH_DN_LINES, the subtraction section 15d determines the end of an FB, and resets the decreased area determining value to 0.

The flash band correcting circuit 17 determines a group of lines from a line at which the vertical integration unit 15 outputs the FB start determining value to a line at which the FB end determining value is output as an "FB estimation section" that is estimated as a section in which an FB is continuous. In addition, an FB end determining value is invalid in a case where the end of an FB is determined in a state in which the start of the FB has not been determined.

Subsequently, an example of the process of the flash band correcting circuit 17 that performs FB correction using the current frame and the past frame based on the FB start/end determining values will be described.

Figure 8:
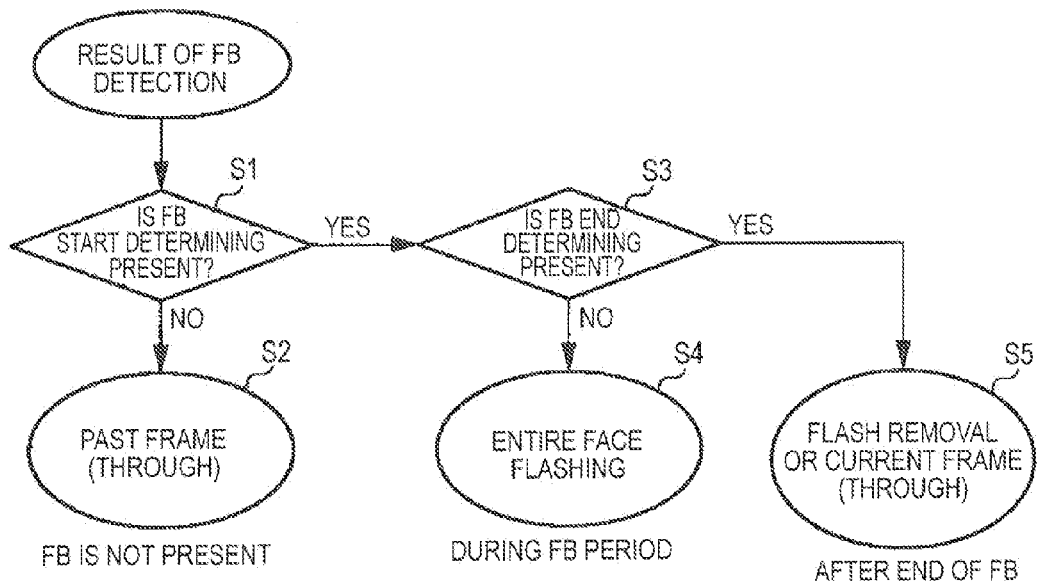
FIG. 8 is a flowchart illustrating an operation example of an FB correcting process according to an embodiment of the present disclosure.

FIG. 8 is a flowchart illustrating an operation example of the FB correcting process.

First, the flash band correcting circuit 17 determines whether an FB start determining value is present within the frame based on the FB start/end determining values output by the flash band detecting circuit 10 (Step S1). In a case where an FB start determining value is not present, the past frame (a frame that is a target for detecting an FB) is directly output (hereinafter, referred to as a "through output") without performing any correction process therefor (Step S2). In this through output, not only an output frame acquired by replicating the past frame is output, but there is a case where an output frame acquired by replicating the current frame is output.

In a case where an FB start determining value is present, it is determined whether an FB end determining value is present within a frame (Step S3). In a case where the FB end determining value is not present, it can be estimated that it is currently during an FB period. In such a case, an "entire face flashing process" is performed in which the luminance values of the pixel included in the current frame and the past frame are compared, and an output frame to be replaced into a pixel having a larger luminance value is output, whereby the difference in the level due to the FB is resolved (Step S4). Through the entire face flashing process, the levels of pixels within a specific frame can be raised so as to be uniform over the entire face. In addition, in two frames including the current frame and the past frame, the pixels may be added (averaged). However, the level the flash after the correction through averaging is ½ of the original level.

In the process of Step S3, in a case where the FB start determining value is present, and the FB end determining value is present, it can be estimated that the current line is after the end of the FB. In such a case, a "flash removing process" is performed (Step S4) in which the effect of the flash is removed from the frame by comparing luminance values of the pixel included in the current frame and the past frame and outputting an output frame to be replaced into the pixel having a lower luminance. In addition, a "replication mode" may be selected in which the current frame is through output (See FIGS. 11 to 14). However, in a case where an FB to be started next is included in the current frame of which an FB is completed, when the through output is performed, the FB disclosed below is directly represented.

For an FB (FIG. 14) that is completed within one frame, a frame immediately after a frame in which an FB is started is estimated to be after the end of the FB. Accordingly, by lowering the level within the frame to be uniform on the entire face, a flash removing process for excluding flash is performed. In the case of the FB that is completed within one frame, since an area in which flash is imaged is not present in the past frame, and accordingly, it is difficult to perform an entire face flashing process in which the current frame and the past frame are combined. Accordingly, a "flash removing process" in which the FB is removed from the current frame is an effective correction method.

Figure 9:
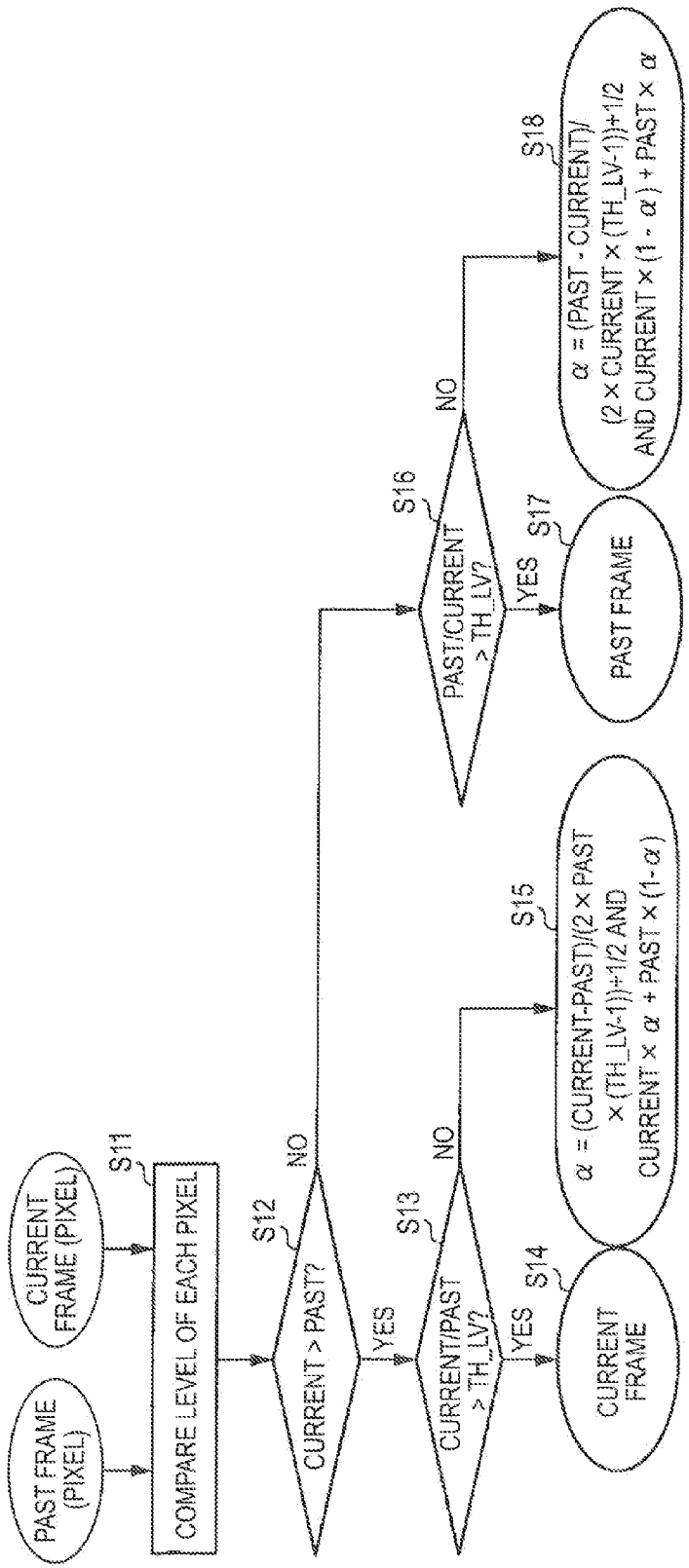
FIG. 9 is a flowchart illustrating an operation example of an entire face flashing process according to an embodiment of the present disclosure.

FIG. 9 is a flowchart illustrating an operation example of the entire face flashing process described in Step S4 shown in FIG. 8. In the entire face flashing process, a process is performed in which a bright pixel having a high level included in the current frame and the past frame is collected in the output frame.

First, the flash band correcting circuit 17 compares the level of each pixel in the current frame and the past frame (Step S11). Then, it is determined whether or not the level of the pixel included in the current frame is higher than the level of the pixel included in the past frame (Step S12).

Next, in a case where the level of the pixel included in the current frame is higher than the level of the pixel included in the past frame, it is determined whether or not a "level variation rate" acquired by dividing the level of the pixel of the current frame by the level of the pixel of the past frame is larger than the threshold value TH_LV (Step S13). In a case where this level variation ration is larger than the threshold value TH_LV, an output frame, in which a pixel of which level is low is replaced with the pixel having a high level in the past frame, is output (Step S14).

On the other hand, in a case where the level variation ratio is low (equal to or less than threshold value TH_LV), the level of the current frame and the level of the past frame are mixed through α blending or the like according to the level variation ratio. The mixing ratio α at this time is set to a value so as to be 0.5 in a case where the variation ratio is 1 (the levels are the same) and 1.0 in a case where the variation ratio is TH_LV. When the level of the pixel having a higher level is H, and the level of the pixel having a lower level is L, the following calculation equation satisfies the above-described mixing ratio α. In the description presented below, in order to simplify the equation, there is a case where the level of the pixel included in the current frame is abbreviated to "current", and the level of the pixel included in the past frame is abbreviated to "past".

$$\alpha = \begin{cases} 1.0 & (H \geq L \times \mathrm{TH\_LV}) \\ \dfrac{H - L}{2L \times (\mathrm{TH\_LV} - 1)} + 0.5 & \text{(the other cases)} \end{cases} \quad (1)$$

In the flash band correcting circuit 17 of this example, α=(current−past)/(2×past×(TH_LV−1))+½, and a process for current×α+past×(1−α) is performed (Step S15). In addition, it is preferable to apply a low pass filter (LPF) such that the mixing ratio α is smooth in the spatial direction of the frame. Accordingly, an output frame is output by generating an image in which flash is imaged on the entire face.

Also in a case where the level of the pixel of the current frame is equal to or lower than the level of the pixel of the past frame, similarly to Step S13, the flash band correcting circuit 17 determines whether the level variation ratio is higher than the threshold value TH_LV in the process of Step S12 (Step S16). In a case where the level variation ratio is higher than the threshold value TH_LV, an output frame is output by replacing the pixel having a low level in the past frame with the pixel having a high level in the current frame (Step S17).

In a case where the level variation ratio is low (equal to or lower than the threshold value TH_LV), the flash band correcting circuit 17 mixes the levels of the pixels through a blending or the like according to the level variation ratio (Step S16). In this example, α=(past−current)/(2×current×(TH_LV−1))+½, and a process for current×(1−α)+past×α is performed (Step S15). In addition, it is desirable to apply a low pass filter such that the mixing ratio α is smooth in the spatial direction of the frame. Accordingly, an output frame in which a video, in which flash is imaged on the entire face, is generated is output.

Figure 10:
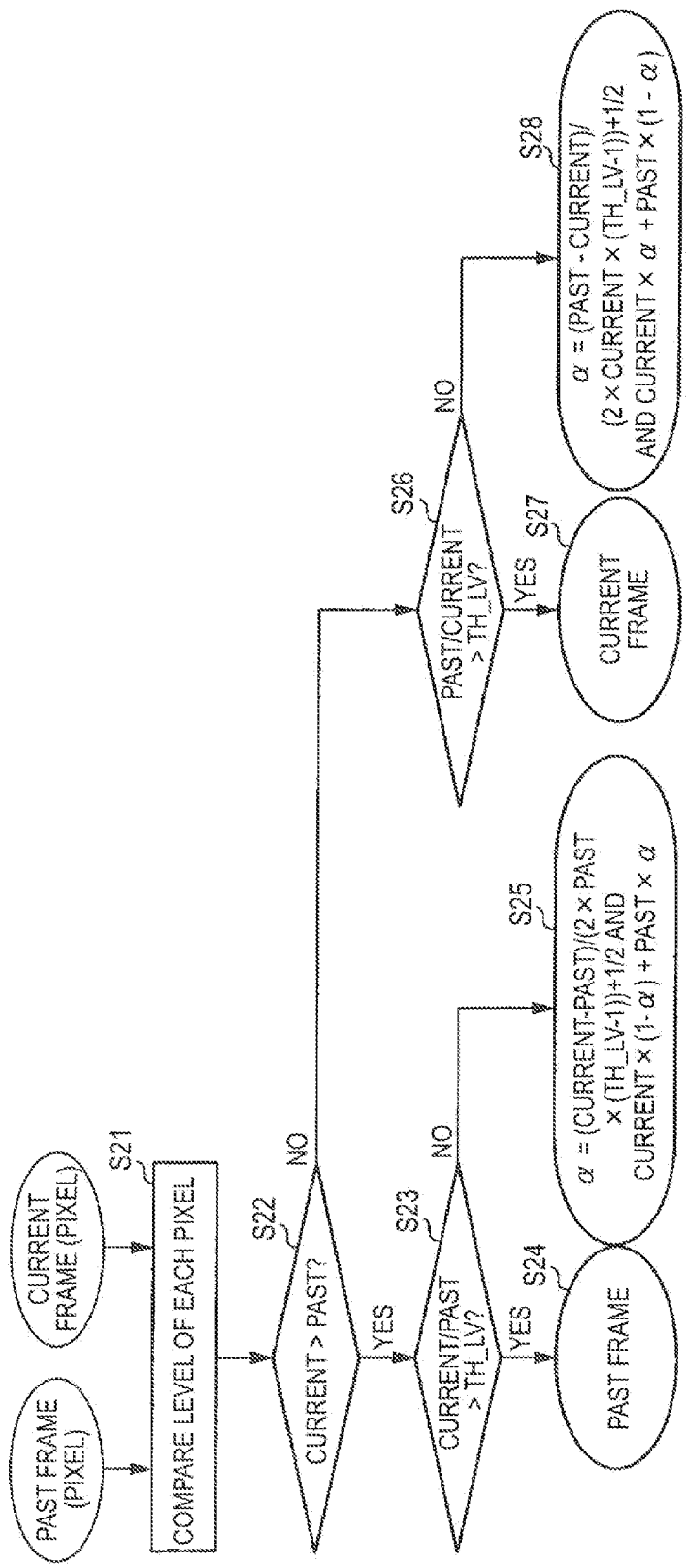
FIG. 10 is a flowchart illustrating an operation example of a flash removing process according to an embodiment of the present disclosure.

FIG. 10 is a flowchart illustrating an operation example of the flash removing process described in Step S5 illustrated in FIG. 8. In the flash removing process, a process is performed in which dark pixels having a low level that are included in the current frame and the past frame are collected in the output frame.

In contrast to the entire face flashing process described with reference to FIG. 9, the flash band correcting circuit 17 replaces the pixel having a high level in the current frame is replaced with a pixel having a low level in the past frame. More specifically, for the mixing ratio α calculated in the entire face flashing process, 1−α may be set to the mixing ratio. Accordingly, a video in which flash is not included in the entire face of the frame, in other words, a video in which an FB is removed can be generated.

First, the flash band correcting circuit 17 compares the levels of each pixel in the current frame and the past frame (Step S21). Then, the flash band correcting circuit 17 determines whether the level of the pixel included in the current frame is higher than the level of the pixel included in the past frame (Step S22).

Next, in a case where the level of the pixel included in the current frame is higher than the level of the pixel included in the past frame, the flash band correcting circuit 17 determines whether or not the level variation ratio is higher than the threshold value TH_LV (Step S23): In a case where the level variation ratio is higher than the threshold value TH_LV, an output frame is output by replacing the pixel having a high level in the past frame is replaced with the pixel having a low pixel in the current frame (Step S24).

In a case where the level variation ratio is low (equal to or lower than the threshold value TH_LV), the flash band correcting circuit 17 mixes the levels through α blending or the like according to the level variation ratio. The mixing ratio α at this time is set to a value so as to be 0.5 in a case where the variation ratio is 1 (the levels are the same) and 1.0 in a case where the variation ratio is TH_LV.

In the flash band correcting circuit 17 of this example, α=(current−past)/(2×past×(TH_LV−1))+½, and a process for current×(1−α)+past×α is performed (Step S25). In addition, it is preferable to apply a low pass filter such that the mixing ratio α is smooth in the spatial direction of the frame. Accordingly, an output frame is output by generating an image in which the FB is removed on the entire face.

In the process of Step S22, also in a case where the level of the pixel of the current frame is equal to or lower than the level of the pixel of the past frame, similarly to Step S23, the flash band correcting circuit 17 determines whether the level variation ratio is higher than the threshold value TH_LV (Step S26). In a case where the level variation ratio is higher than the threshold value TH_LV, an output frame is output by replacing the pixel having a high level in the past frame with the pixel having a low level in the current frame (Step S27).

In a case where the level variation ratio is low (equal to or lower than the threshold value TH_LV), the flash band correcting circuit 17 mixes the levels of the pixels through α blending or the like according to the level variation ratio (Step S26). The flash band correcting circuit 17 sets α=(past−current)/(2×current×(TH_LV−1))+½ and performs a process for current×α+past×(1−α) (Step S25). In addition, it is desirable to apply a low pass filter such that the mixing ratio α is smooth in the spatial direction of the frame. Accordingly, an output frame in which a video imaged in the same state as a state when flash is on the entire face is generated is output.

Next, an operation example in which the flash band detecting circuit 10 detects an FB generated in the frame, and the flash band correcting circuit 17 corrects the FB will be described with reference to FIGS. 11 to 14.

FIG. 11 illustrates an example of output frames in a case where FBs are generated consecutively in two frames.

In FIG. 11, the video frames input to the flash band detecting circuit 10 are illustrated from the first frame to the fifth frame. In this example, an FB is generated in the lower portion of the second frame and the upper portion of the third frame.

The flash band detecting circuit 10 detects an increased area from the line in which the FB of the second frame is started out of input video frames and detects a decreased area from a line at which an FB of the third frame ends. Then, the flash band correcting circuit 17 outputs the first frame as a through output also in one of a removal mode and a replication mode. Next, the flash band correcting circuit 17 performs the entire face flashing process in which the increased areas of the second frame and the third frame are combined and outputs the result. Next, in the removal mode, decreased areas of the third frame and the fourth frame are combined and output with flash being removed. On the other hand, in the replication mode, the fourth frame is output as a through output. Since the FB correction is unnecessary for the output frames after that, the output frame is directly output as a through output.

In addition, the flash band correcting circuit 17 sets the past frame one frame before the current frame as an output frame when the through output is performed. However, in a case where an FB is included in the frame one frame before the current frame, and the entire face flashing process or the flash removing process is not performed, the frame that is output as an through output is changed such that the current frame is set as the output frame, and thereafter, the past frame is set as the output frame.

Figure 12B:
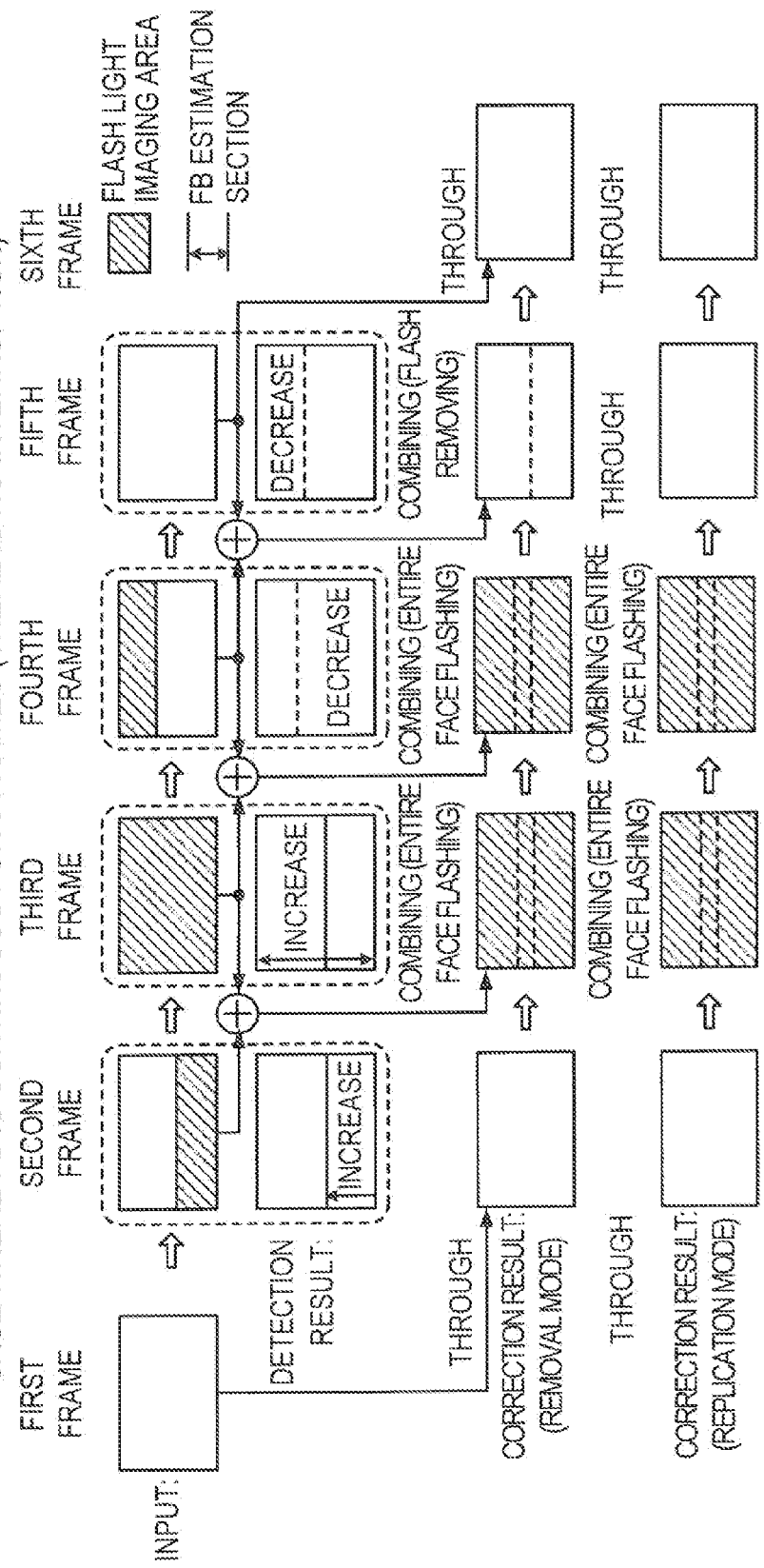

FIGS. 12A and 12B are schematic diagrams illustrating an example of output frames in a case where FBs are generated consecutively in three frames.

In FIGS. 12A and 12B, video frames input to the flash band detecting circuit 10 are illustrated from the first frame to the sixth frame. In this example, FBs are generated twice from the second frame to the fourth frame.

FIG. 12A illustrates an example of an FB detecting process and an FB correcting process in a case where there is an interrupt in the FB.

In this example, although an FB is generated from the second frame to the fourth frame, flash is consecutively on in a short time, whereby the FB is interrupted in the third frame. In such a case, the flash band detecting circuit 10 detects an increased area from the FB start line included in the second frame in which flash is on for the first time and recognizes up to the FB end line at which a decreased area is detected as an FB estimation section. In addition, in the third frame, a decreased area is detected from the FB end line at which flash ends, and next, an increased area is detected from the FB start line included in an area in which flash is on next time. Then, in the fourth frame, a decreased area is recognized from the FB end line at which flash is interrupted, and the decreased area is recognized also in the fifth frame.

Then, the flash band correcting circuit 17, in any one of the removal mode and the replication mode, outputs the first frame as a through output and outputs the second and third frames and the third and fourth frames as entire face flash by combining increased areas. In addition, in the removal mode, the decreased areas of the fourth and fifth frames are combined and output by removing flash. In addition, in the replication mode, the fifth frame is output as a through output. For the output frames after that, the FB correction is not necessary, and the output frames are directly output as through outputs.

FIG. 12B illustrates an example of an FB detecting process and an FB correcting process in a case where there is no interrupt in the FB.

FIG. 12B is different from FIG. 12A that there is no interrupt of the FB in the third frame. Accordingly, the flash band detecting circuit 10 detects the generation of an FB by detecting an increased area and a decreased area in each frame. Then, the flash band correcting circuit 17, as illustrated in FIG. 12A, outputs a frame in which an FB is generated as a through output and outputs an frame in which an FB is generated by combining increased areas. In addition, the flash band correcting circuit 17 outputs a frame in which an FB end line is included with flash being removed by combining a decreased area of the next frame.

FIGS. 13A to 13C illustrate an example of output frames in a case where FBs are generated consecutively in four or more frames.

In FIGS. 13A to 13C, video frames input to the flash band detecting circuit 10 are illustrated from the first frame to the seventh frame. In this example, FBs are generated twice from the second frame to the fifth frame.

FIG. 13A illustrates an example of an FB detecting process and an FB correcting process in a case where an FB is generated continuously over four frames, and there is an interrupt in the FB over one frame.

In this example, although an FB is generated from the second frame to the fifth frame, flash is continuously on in a short time, whereby the FB is interrupted from the third frame to the fourth frame. The period in which the FB is interrupted has a length equal to or longer than one frame. In such a case, the flash band detecting circuit 10 recognizes areas in which increased areas are detected from the second frame to the third frame and from the fourth frame to the fifth frame as FB estimation sections. In addition, the flash band detecting circuit 10 recognizes from the FB end lines from the third frame to the fourth frame and the fifth frame and thereafter at which flash is interrupted as decreased areas.

Then, the flash band correcting circuit 17, in any one of the removal mode and the replication mode, outputs the first frame as a through output and performs the entire face flashing process in which increased areas are combined for the second and third frames and the fourth and fifth frames and outputs the processed frames. In addition, in the removal mode, the entire face flashing process is performed for the third and fourth frames, and the fifth and sixth frames are output by combining decreased areas thereof and performing the flash removing process for them. In addition, in the replication mode, the fourth and fifth frames are output as through outputs. For the output frames after that, the FB correction is not necessary, and the output frames are directly output as through outputs.

FIG. 13B illustrates an example of an FB detecting process and an FB correcting process in a case where an FB is generated continuously four frames or more, and there is an interrupt in the FB less than one frame.

In this example, although the FB is generated from the second frame to the fifth frame, flash is continuously on for a short time, and accordingly, the FB is interrupted from the third frame to the fourth frame. A period in which the FB is interrupted has a length that is less than one frame. In such a case, the flash band detecting circuit 10 recognizes portions in which increased areas are detected from the second frame to the third frame and from the fourth frame to the fifth frame as FB estimation sections. In addition, the flash band detecting circuit 10 recognizes a decreased area from the FB end line in which flash is interrupted from the third frame to the fourth frame and the fifth frame and after that.

Then, the flash band correcting circuit 17, in any one of the removal mode and the replication mode, outputs the first frame as a through output and performs the entire face flashing process in which increased areas are combined for the second and third frames and the fourth and fifth frames and outputs the processed frames. In addition, in the removal mode, the entire face flashing process is performed for the third and fourth frames, and the fifth and sixth frames are output by combining decreased areas thereof and performing the flash removing process for them. In addition, in the replication mode, the fourth and fifth frames are output as through outputs. For the output frames after that, the FB correction is not necessary, and the output frames are directly output as through outputs.

FIG. 13C illustrates an example of an FB detecting process and an FB correcting process in a case where an FB is generated continuously four frames or more, and there is no interrupt in the FB.

In this example, although an FB is generated from the second frame to the fifth frame, flash is on in a long time, whereby there is no interrupt in the FB. In such a case, the flash band detecting circuit 10 recognizes a portion in which an increased area is detected from the second frame to the fifth frame as FB estimation sections. In addition, the flash band detecting circuit 10 recognizes a decreased area from an FB end line at which flash is interrupted in the fifth frame and the sixth frame.

Then, the flash band correcting circuit 17, in any one of the removal mode and the replication mode, outputs the first frame as a through output and performs the entire face flashing process in which increased areas are combined for the second and third frames and the third and fourth frames and outputs the processed frames as entire face flash. In addition, the output frames after the fourth frame are directly output as through outputs.

FIG. 14 illustrates an example of output frames in a case where an FB is completed within one frame.

In FIG. 14, video frames input to the flash band detecting circuit 10 are illustrated from the first frame to the fourth frame. In this example, although an FB is generated in the second frame, this FB is completed within the second frame. In such a case, the flash band detecting circuit 10 recognizes a portion in which an increased area is detected in the second frame as an FB estimation section. In addition, in the third frame, the flash band detecting circuit 10 recognizes a decreased area from an FB end line at which a decreased area is detected in the second frame.

Then, the flash band correcting circuit 17 outputs the first frame as a through output. In the removal mode, while the second and third frames are output by combining the second and third frames and performing a removal process for them, in the replication mode, the second frame is output as a through output. For the output frames after that, correction of an FB is not necessary, and the output frames are directly output as through outputs.

The above-described flash band detecting circuit 10 according to embodiment can detect a frame in which an FB is generated in real time by detecting the start line and the end line of the FB generated within the frame. Accordingly, by performing a correction process appropriate for the detected FB, a time necessary for video processing is shortened, whereby there is an advantage that the output frames can be output in real time.

In addition to an FB that is continuous for two frames, an FB that is continuous for three or more frames or an FB that is completed within one frame is detected, and the detected FB can be corrected. In addition, not only the generation of an FB from the past frame to the current frame can be detected, but an FB that is generated only within the current frame, which is difficult to detect and correct in the related art, can be detected. Since the flash band correcting circuit 17 corrects the detected FB, an FB over only one frame or a plurality of frames is efficiently corrected, whereby the video quality of the output frames can be improved.

In addition, the flash band correcting circuit 17 can correct an FB in accordance with an increased area and a decreased area within a frame by utilizing the entire face flashing process or the flash removing process based on the FB start/end determining values acquired by the flash band detecting circuit 10. At this time, an appropriate correction method is selected in accordance with a case such as entire face flashing in a case where an FB is continuous for two or more frames or flash removing in a case where an FB is completed within one frame. In addition, through FB correction in which pixels are interchanged between the current frame and the past frame, the level of a video of flash included in an output frame after correction is not decreased from the level of the original flash included in a frame before correction. Furthermore, by arbitrarily setting the removal mode or the replication mode, the flash band correcting circuit 17 can select to output a frame in which an FB is generated as a through output.

In addition, both the flash band detecting circuit 10 and the flash band correcting circuit 17 may refer to only two frames including the current frame and the past frame that is immediately prior thereto when the FB detection and the FB correction are performed. Accordingly, the recording unit 11 may be included as a frame memory corresponding to one frame, and accordingly, the flash band processing circuit can be realized at low cost.

<2. Modified Examples>

In addition, after detecting an FB within a frame, the flash band detecting circuit 10 may assign a sign that indicates the detection of the FB to an auxiliary data area of the frame in which the FB is detected. The flash band correcting circuit 17 can correct the FB based on the sign. Accordingly, after the frame in which the FB is detected by the flash band detecting circuit 10 is recorded in the recording unit 11 once, the flash band correcting circuit 17 may read out the frame from the recording unit 11 and correct the FB in accordance with the sign.

In the related art, as a method of correcting the detected FB, there is a general method in which two frames in which an FB is present in the lower portion and the upper portion are added and averaged. Accordingly, by using the method of adding and averaging the luminance values of the pixels included in the current frame and the past frame, the imaging environments can be responded in a flexible manner.

In addition, the series of the processes according to the above-described embodiment may be performed by either hardware or software. In a case where the series of the processes is performed by software, it can be performed by a computer in which programs configuring the software are built in dedicated hardware or a computer to which programs for performing various functions are installed. For example, the series of the processes may be performed by installing programs configuring desired software to a general-purpose personal computer or the like.

Furthermore, a recording medium on which a program code of the software that realizes the functions of the above-described embodiment is recorded may be supplied to a system or an apparatus. In addition, it is apparent that the functions can be realized by reading out and executing the program code stored on the recoding medium by using a computer (or a control device such as a CPU) of the system or the apparatus.

As a recording medium for supplying the program code in such a case, for example, a flexible disc, a hard disk, an optical disk, a magneto optical disk, a CD-ROM, a CD-R, a magnetic tape, a non-volatile memory card, a ROM, or the like can be used.

In addition, the computer executes the read-out code, whereby the functions of the above-described embodiment are realized. Furthermore, based on the instruction of the program code, an OS or the like that operates on the computer performs a part of or the entirety of the actual process. A case where the functions of the above-described embodiment are realized by the process is included therein.

Furthermore, the present disclosure is not limited to the above-described embodiment, and it is apparent that other various applications and modified examples can be used as long as they are not departed from the concept of the present disclosure that is defined by the appended claims.

In addition, the present disclosure may also have the following configurations.

(1) There is provided a flash band processing circuit that includes: a flash band detecting circuit that detects a start line and an end line of a flash band, which is a level difference for each line generated within a frame in accordance with flash light, based on a difference in exposure periods of a video signal output for each frame by a pixel included in an imaging device employing a rolling shutter system.

(2) The above-described flash band processing circuit described in (1), wherein the flash band detecting circuit detects generation of the flash band within a current frame output by the imaging device or generation, of the flash band from a past frame output by the imaging device from a predetermined number of frames before the current frame to the current frame.

(3) The above-described flash band processing circuit described in (2), wherein the flash band detecting circuit detects the generation of the flash band by acquiring a comparison result by comparing levels between frames in which the current frame and the past frame are consecutive for each pixel, specifying a horizontal line in which a variation amount is large based on the comparison result, and detecting a line that is a boundary between the consecutive horizontal lines in which the variation amount is large and the consecutive horizontal lines in which the variation amount is small.

(4) The above-described flash band processing circuit described in (3), further including: a level comparing unit that acquires a ratio of luminance levels of the pixel present at a specific position of the current and past frames as a level variation ratio and acquires a level variation amount that indicates whether or not the level variation ratio is equal to or higher than a first threshold value as a variation amount determining value; a horizontal integration unit that acquires an integral value determining value that indicates whether a horizontal integral value acquired by integrating the variation amount determining value, of which the level variation ratio is equal to or higher than a first threshold value, for each pixel included in the line over the horizontal direction of the current frame is equal to or larger than a second threshold value and acquires an integral value sign that represents a positive sign or a negative sign of the integral value; an area determining unit that, based on the integral value determining value and the integral value sign, outputs an increased area determining value determining an increased area in which luminance of the pixel included in the current frame is higher than that in the past frame in a case where the integral value sign is positive and outputs a decreased area determining value determining a decreased area in which the luminance of the pixel included in the current frame is lower than that in the past frame in a case where the integral value sign is negative; a vertical integration unit that outputs a flash band start determining value representing a start of the flash band within the frame in a case where an increased area determining value integral value acquired by integrating the increased area determining value for each line in the vertical direction is equal to or larger than a third threshold value and outputs a flash band end determining value representing an end of the flash band within the frame in a case where a decreased area determining value integral value acquired by integrating the decreased area determining value for each line in the vertical direction is equal to or larger than a fourth threshold value; and a determination maintaining unit that maintains the flash band start determining value and the flash band end determining value for a predetermined period in accordance with a line period and a frame period based on the line period and the frame period of the frame, outputs a flash hand start line determining value determining a start line of the flash band based on the flash band start determining value, and outputs a flash band end line determining value determining an end line of the flash band based on the flash band end determining value to the area determining unit.

(5) The above-described flash band processing circuit described in (4), wherein the horizontal integration unit acquires a second integral value determining value representing whether or not an integral value acquired by integrating a result of subtracting one variation amount determining value from the other variation amount determining value is equal to or larger than a fifth threshold value for each pixel included in the lines adjacent to each other in the vertical direction located at a same position in the horizontal direction and acquires a second integral value sign representing whether the integral value has a positive sign or a negative sign, and wherein the area determining unit detects whether or not the flash band due to the flash light is present by determining whether or not a high-frequency component in the vertical direction is present within the frame based on the second integral value determining value and the second integral value sign.

(6) The above-described flash band processing circuit described in any one of (1) to (5), wherein a sign that represents the detection of the flash band is attached to an auxiliary data area of the frame in which the flash band has been detected.

(7) The above-described flash band processing circuit described in any one of (1) to (6), further including: a flash band correcting unit that outputs an output frame of which the flash band generated within the frame is corrected based on the flash band start determining value and the flash band end determining value.

(8) The above-described flash band processing circuit described in (7), wherein the flash band correcting unit compares luminance values of the pixel included in the current frame and the past frame and outputs the output frame in which the pixel having a larger luminance value is replaced.

(9) The above-described flash band processing circuit described in (7) or (8), wherein the flash band correcting unit compares luminance values of the pixel included in the current frame and the past frame and outputs the output frame in which the pixel having a smaller luminance value is replaced.

(10) The above-described flash band processing circuit described in any one of (7) to (9), wherein the flash band correcting unit outputs the output frame that is acquired by replicating the past frame.

(11) The above-described flash band processing circuit described in any one of (7) to (10), wherein the flash band correcting unit outputs the output frame acquired by adding and averaging luminance values of the pixel included in the current frame and the past frame.

(12) There is provided a method of processing a flash band. The method includes: detecting a start line and an end line of a flash band, which is a level difference for each line generated within a frame in accordance with flash light, based on a difference in exposure periods of a video signal output for each frame by a pixel included in an imaging device employing a rolling shutter system.

(13) There is provided an imaging apparatus including: a flash band detecting circuit that detects a start line and an end line of a flash band, which is a level difference for each line generated within a frame in accordance with flash light, based on a difference in exposure periods of a video signal for each line that is output for each frame by a pixel included in an imaging device employing a rolling shutter system; and a flash band correcting circuit that outputs an output frame that is corrected to a video in which there is no flash band generated within the frame.

(14) There is provided an imaging processing method including: detecting a start line and an end line of a flash band, which is a level difference for each line generated within a frame in accordance with flash light, based on a difference in exposure periods of a video signal output for each frame by a pixel included in an imaging device employing a rolling shutter system; and outputting an output frame that is corrected to a video in which there is no flash band generated within the frame.

The present disclosure contains subject matter related to that disclosed in Japanese Priority Patent Application JP 2011-012034 filed in the Japan Patent Office on Jan. 24, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A flash band processing circuit comprising:
a flash band detecting circuit that detects a start line and an end line of a flash band, which is a difference in luminance level for each line generated within a frame of video frames input to the flash band processing circuit, in accordance with flash light in an imaging device employing a rolling shutter system, based on a comparison of luminance level of a pixel located at a position in a current frame and luminance level of a pixel located at the same position in a past frame for one or more frames output by the imaging device, wherein the start line is included in the past frame of the video frames and the end line is included in the current frame of the video frames.

2. The flash band processing circuit according to claim 1, wherein the flash band detecting circuit detects generation of the flash band within the current frame output by the imaging device or generation of the flash band from the past frame, output by the imaging device from a predetermined number of frames before the current frame, to the current frame.

3. The flash band processing circuit according to claim 2, wherein the flash band detecting circuit detects the generation of the flash band by:
acquiring a comparison result by comparing luminance levels between frames in which the current frame and the past frame are consecutive for each pixel,
specifying a horizontal line in which a variation amount is large based on the comparison result, and
detecting a line that is a boundary between consecutive horizontal lines in which the variation amount is large and the consecutive horizontal lines in which the variation amount is small.

4. A flash band processing circuit comprising:
a flash band detecting circuit that detects a start line and an end line of a flash band, which is a level difference for each line generated within a frame in accordance with flash light, based on a difference in exposure periods of a video signal output for each frame by a pixel included in an imaging device employing a rolling shutter system;
a level comparing unit that acquires a ratio of luminance levels of the pixel present at a specific position of a current frame and a past frame as a level variation ratio and acquires a level variation amount that indicates whether or not the level variation ratio is equal to or higher than a first threshold value as a variation amount determining value, wherein the past frame is output by the imaging device a predetermined number of frames before the current frame;
a horizontal integration unit that acquires a first integral value determining a value that indicates whether a horizontal integral value acquired by integrating the variation amount determining value, of which the level variation ratio is equal to or higher than the first threshold value, for each pixel included in a horizontal line of the current frame is equal to or larger than a second threshold value and acquires a first integral value sign that represents a positive sign or a negative sign of the first integral value;
an area determining unit that, based on the first integral value and the first integral value sign, outputs an increased area determining value determining an increased area in which luminance level of the pixel included in the current frame is higher than that in the past frame in a case where the first integral value sign is positive and outputs a decreased area determining value determining a decreased area in which luminance level of the pixel included in the current frame is lower than that in the past frame in a case where the first integral value sign is negative;
a vertical integration unit that outputs a flash band start determining value representing a start of the flash band within the frame in a case where an increased area determining value integral value acquired by integrating the increased area determining value for each horizontal line in the vertical direction is equal to or larger than a third threshold value and outputs a flash band end determining value representing an end of the flash band within the frame in a case where a decreased area determining value integral value acquired by integrating the decreased area determining value for each horizontal line in the vertical direction is equal to or larger than a fourth threshold value; and a determination maintaining unit that maintains the flash band start determining value and the flash band end determining value for a predetermined period in accordance with a line period and a frame period of the frame, outputs a flash band start line determining value determining the start line of the flash band based on the flash band start determining value, and outputs a flash band end line determining value determining the end line of the flash band based on the flash band end determining value to the area determining unit.

5. The flash band processing circuit according to claim 4, wherein the horizontal integration unit acquires a second integral value determining value representing whether or not an integral value acquired by integrating a result of subtracting one variation amount determining value from the other variation amount determining value is equal to or larger than a fifth threshold value for each pixel included in the horizontal lines adjacent to each other in the vertical direction located at a same position in the horizontal direction and acquires a second integral value sign representing whether the second integral value has a positive sign or a negative sign, and wherein the area determining unit detects whether or not the flash band due to the flash light is present by determining whether or not a high-frequency component in the vertical direction is present within the frame based on the second integral value determining value and the second integral value sign.

6. The flash band processing circuit according to claim 5, wherein a sign that represents the detection of the flash band is attached to an auxiliary data area of the frame in which the flash band has been detected.

7. The flash band processing circuit according to claim 6, further comprising:

a flash band correcting unit that outputs an output frame of which the flash band generated within the frame is corrected based on the flash band start determining value and the flash band end determining value.

8. The flash band processing circuit according to claim 7, wherein the flash band correcting unit compares luminance values of the pixel included in the current frame and the past frame and outputs the output frame in which the pixel having a larger luminance value is replaced.

9. The flash band processing circuit according to claim 7, wherein the flash band correcting unit compares luminance values of the pixel included in the current frame and the past frame and outputs the output frame in which the pixel having a smaller luminance value is replaced.

10. The flash band processing circuit according to claim 7, wherein the flash band correcting unit outputs the output frame that is acquired by replicating the past frame.

11. The flash band processing circuit according to claim 7, wherein the flash band correcting unit outputs the output frame acquired by adding and averaging luminance values of the pixel included in the current frame and the past frame.

12. A method of processing a flash band, the method comprising:

in a flash band processing circuit:

detecting a start line and an end line of a flash band, which is a difference in luminance level for each line generated within a frame of video frames input to the flash band processing circuit, in accordance with flash light in an imaging device employing a rolling shutter system, based on a comparison of luminance level of a pixel located at a position in a current frame and luminance level of a pixel located at the same position in a past frame for one or more frames output by the imaging device, wherein the start line is included in the past frame of the video frames and the end line is included in the current frame of the video frames.

13. An imaging apparatus comprising:

a flash band detecting circuit that detects a start line and an end line of a flash band, which is a difference in luminance level for each line generated within a frame of video frames input to the flash band detecting circuit, in accordance with flash light in an imaging device employing a rolling shutter system, based on a comparison of luminance level of a pixel located at a position in a current frame and luminance level of a pixel located at the same position in a past frame for one or more frames output by the imaging device; and a flash band correcting circuit that outputs one or more output frames that are corrected to a video in which there is no flash band generated within the one or more output frames, wherein the start line is included in the past frame of the video frames and the end line is included in the current frame of the video frames.

14. An imaging processing method comprising:

in a flash band processing circuit:

detecting a start line and an end line of a flash band, which is a difference in luminance level for each line generated within a frame of video frames input to the flash band processing circuit, in accordance with flash light in an imaging device employing a rolling shutter system, based on a comparison of luminance level of a pixel located at a position in a current frame and luminance level of a pixel located at the same position in a past frame for one or more frames output by the imaging device; and outputting one or more output frames that are corrected to a video in which there is no flash band generated within the one or more output frames, wherein the start line is included in the past frame of the video frames and the end line is included in the current frame of the video frames.

* * * * *